US011470050B2

(12) United States Patent
Gilboy

(10) Patent No.: US 11,470,050 B2
(45) Date of Patent: Oct. 11, 2022

(54) WEB ACTIVITY CONCEALMENT

(71) Applicant: AT&T Intellectual Property I, L.P., Atlanta, GA (US)

(72) Inventor: Christopher P. Gilboy, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 237 days.

(21) Appl. No.: 16/516,442

(22) Filed: Jul. 19, 2019

(65) Prior Publication Data
US 2021/0021574 A1    Jan. 21, 2021

(51) Int. Cl.
| | |
|---|---|
| H04L 12/24 | (2006.01) |
| H04L 41/0803 | (2022.01) |
| H04L 9/40 | (2022.01) |
| H04W 4/70 | (2018.01) |
| H04W 12/02 | (2009.01) |
| H04L 67/12 | (2022.01) |
| G06F 21/62 | (2013.01) |
| H04L 67/50 | (2022.01) |

(52) U.S. Cl.
CPC .......... *H04L 63/04* (2013.01); *G06F 21/6245* (2013.01); *G06F 21/6263* (2013.01); *H04L 63/0421* (2013.01); *H04L 67/12* (2013.01); *H04L 67/535* (2022.05); *H04W 4/70* (2018.02); *H04W 12/02* (2013.01)

(58) Field of Classification Search
CPC ..... H04L 63/04; H04L 63/0421; H04L 67/22; H04L 67/12; H04L 63/0407; H04L 67/02; G06F 21/6245; G06F 21/6263; H04W 4/70; H04W 12/02

USPC .......................................................... 726/26
See application file for complete search history.

(56) References Cited

U.S. PATENT DOCUMENTS

| | | | | |
|---|---|---|---|---|
| 10,659,378 | B2* | 5/2020 | Blumenthal | ........... H04L 69/40 |
| 2004/0064431 | A1* | 4/2004 | Dorner | ............... G06F 16/9535 |
| 2007/0266091 | A1* | 11/2007 | Lin | ....................... H04L 67/303 |
| | | | | 709/204 |
| 2010/0250497 | A1* | 9/2010 | Redlich | ............... H04L 63/0227 |
| | | | | 707/661 |
| 2010/0306552 | A1* | 12/2010 | LeVine | ................... G06F 21/14 |
| | | | | 713/189 |
| 2012/0084464 | A1* | 4/2012 | Cochinwala | ............ H04L 43/50 |
| | | | | 709/246 |
| 2016/0219024 | A1* | 7/2016 | Verzun | ...................... H04L 9/34 |

* cited by examiner

*Primary Examiner* — Yves Dalencourt
*Assistant Examiner* — Elizabeth Kassa
(74) *Attorney, Agent, or Firm* — Hartman & Citrin LLC

(57) ABSTRACT

Concepts and technologies are disclosed herein for web activity concealment. A system can include a memory storing instructions that, upon execution by a processor, cause the processor to perform operations. The system can be communicatively coupled to a network. The operations can include detecting a network message that is directed to a target source, where the network message is generated by a client application of a machine-to-machine device. The operations can include identifying, based on the network message, a client action that is associated with the client application. The operations can include counterpoising the client action by generating a supplemental action command. The operations can include providing the supplemental action command to the machine-to-machine device.

20 Claims, 9 Drawing Sheets

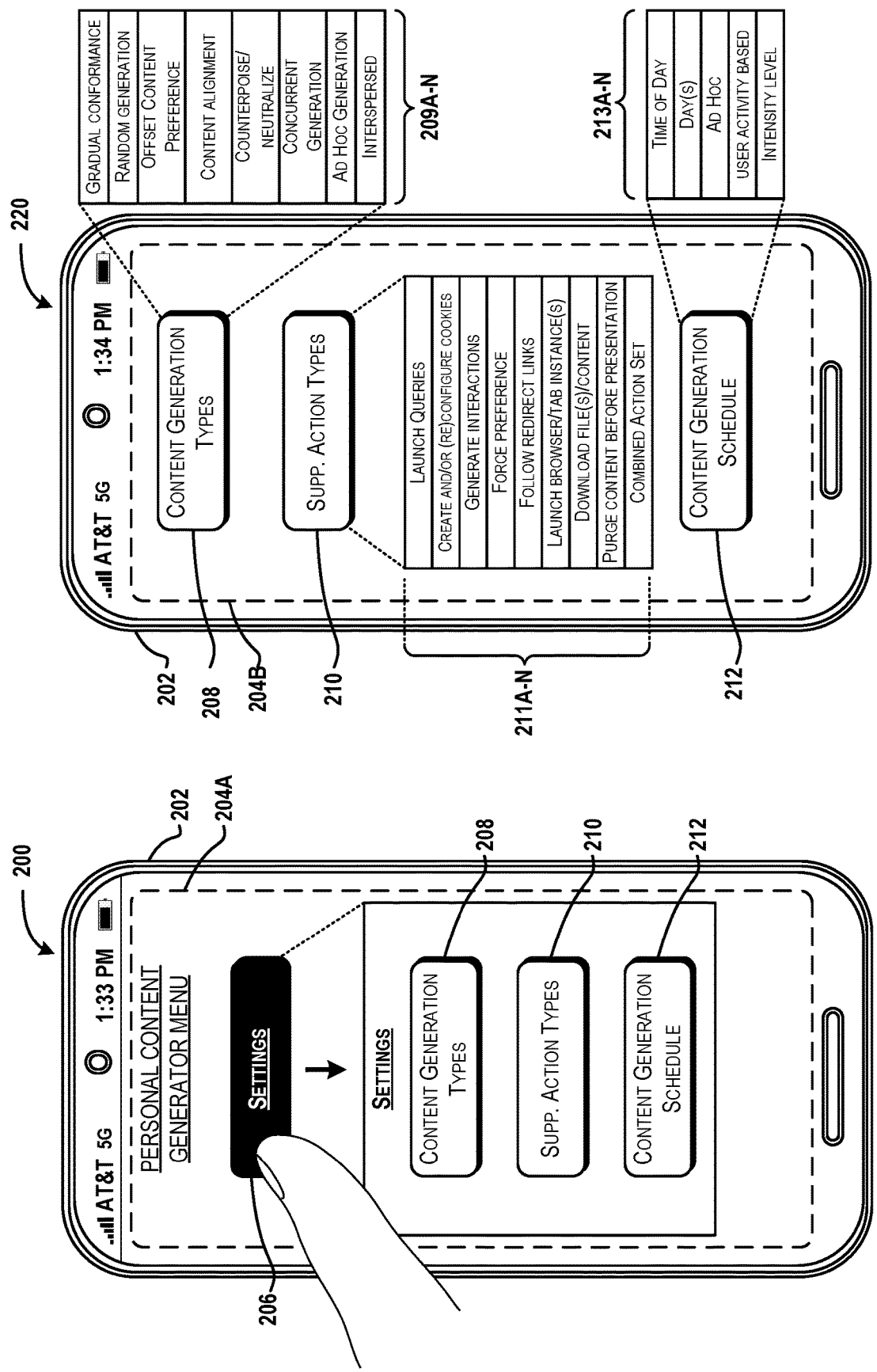

US 11,470,050 B2

WEB ACTIVITY CONCEALMENT

BACKGROUND

Over the past several years, communication mechanisms have become prevalent, whether fixed line, mobile, or even implemented as programs running in web browsers. Because of the prevalence of mobile communication devices, modern users may almost always be considered available and/or capable of engaging in various audio and/or visual communication, irrespective of whether the user is available. Various websites, application developers, media platforms, and/or any other network service may seek to track the activities and preferences of users for business-related purposes. In some instances, companies may provide a web service, application, and/or access to a network platform at little or no cost to the user in order to attract a larger user following from which personal data can be collected and stored in, for example a user profile. Many users, however, may not be privy to the personal data that is being stored within the user profile, and in some instances the personal data may be shared for monetization purposes with other companies. The sharing of personal data, irrespective of any consent given by the user, may raise concerns pertaining to privacy violations and/or price discrimination. From a technical perspective, various websites, applications, and/or platforms may execute multiple modules, plug-ins, and/or scripts specific to the collection and/or tracking of personal data and user activity. This can dramatically increase processor utilization, decrease memory availability, increase operating temperatures of the user device, and may overall decrease performance and navigability of the website, application, and/or platform accessed by the user. Moreover, some application developers may attempt to track or otherwise garner information about a user even when the user is not running the application and/or visiting the website and/or service. This may further contribute to potential privacy violations and increased battery depletion.

SUMMARY

The present disclosure is directed to web activity concealment according to various embodiments. According to one aspect of the concepts and technologies disclosed herein, a system is disclosed. The system can include a processor and a memory. The memory can store computer-executable instructions that, when executed by the processor, cause the processor to perform operations. The operations can include detecting a network message that is directed to a target source. The network message can be generated by a client application of a machine-to-machine device. The operations can include identifying, based on the network message, a client action that is associated with the client application. In some embodiments, the client action can include at least one of requesting content from the target source, instantiating a tracking marker associated with the target source, retrieving content from the target source, and indicating a preference corresponding to content provided by the target source.

In some embodiments, the operations can include counterpoising the client action by generating a supplemental action command. In some embodiments, the supplemental action command can instruct the machine-to-machine device to initiate a supplemental client action that generates a supplemental network message. In some embodiments, the network message can include a network address corresponding to a target server that is associated with the target source. In some embodiments, the supplemental network message is directed to an alternate source. In some embodiments, the operations can include determining that the client action corresponds to a first content preference indicator. In some embodiments, the supplemental action command can be generated such that a second content preference indicator is created so as to counterpoise the first content preference indicator. In some embodiments, the operations can include providing the supplemental action command to the machine-to-machine device.

In some embodiments, the operations can include obtaining a network usage record, where the network usage record can identify instances of network activity by the machine-to-machine device. In some embodiments, the operations can include isolating, from the network usage record, client action records that indicate network activity associated with user input. In some embodiments, the client action records can be made available to a network service portal. In some embodiments, the operations can also include intercepting the network message. In some embodiments, intercepting the network message may occur prior to the network message reaching the target source. In some embodiments, the operations can also include releasing the network message so as to be routed to the target source. In some embodiments, the network message may be released and/or provided to the target source in response to one or more operations, such as detecting the supplemental network message from the machine-to-machine device.

According to another aspect of the concepts and technologies disclosed herein, a method is disclosed. In some embodiments, the method can include detecting, by a system executing a processor, a network message that is directed to a target source, where the network message is generated by a client application of a machine-to-machine device. In some embodiments, the method can include identifying, by the system, based on the network message, a client action that is associated with the client application. In some embodiments, the client action can include at least one of requesting content from the target source, instantiating a tracking marker associated with the target source, retrieving content from the target source, and indicating a preference corresponding to content provided by the target source. In some embodiments, the method can include counterpoising, by the system, the client action by generating a supplemental action command. In some embodiments, the supplemental action command can instruct the machine-to-machine device to initiate a supplemental client action that generates a supplemental network message. In some embodiments, the network message can include a network address corresponding to a target server that is associated with the target source, and where the supplemental network message is directed to an alternate source. In some embodiments, the method can include determining, by the processor, that the client action corresponds to a first content preference indicator, where the supplemental action command is generated such that a second content preference indicator is created so as to counterpoise the first content preference indicator. In some embodiments, the method can include providing, by the system, the supplemental action command to the machine-to-machine device.

In some embodiments, the method can include obtaining, by the processor, a network usage record that identifies instances of network activity by the machine-to-machine device. In some embodiments, the method can include isolating, by the processor, from the network usage record, client action records that indicate network activity associated with user input, where the client action records are made available to a network service portal. In some embodiments, the method can include intercepting, by the system, the network message prior to the network message reaching the target source. In some embodiments, the method can include releasing the network message in response to detecting the supplemental network message from the machine-to-machine device.

According to yet another aspect, a computer storage medium is disclosed. The computer storage medium can store computer-executable instructions. The computer-executable instructions can be associated with a network service that facilitates web activity concealment. When the computer-executable instructions are executed by a processor, the processor can perform operations. In some embodiments, the processor can be included in a computer system that supports the network service. The operations can include detecting a network message that is directed to a target source. The network message can be generated by a client application of a machine-to-machine device. The operations can include identifying, based on the network message, a client action that is associated with the client application. In some embodiments, the client action can include at least one of requesting content from the target source, instantiating a tracking marker associated with the target source, retrieving content from the target source, and indicating a preference corresponding to content provided by the target source.

In some embodiments, the operations can include counterpoising the client action by generating a supplemental action command. In some embodiments, the supplemental action command can instruct the machine-to-machine device to initiate a supplemental client action that generates a supplemental network message. In some embodiments, the network message can include a network address corresponding to a target server that is associated with the target source. In some embodiments, the supplemental network message is directed to an alternate source. In some embodiments, the operations can include determining that the client action corresponds to a first content preference indicator. In some embodiments, the supplemental action command can be generated such that a second content preference indicator is created so as to counterpoise the first content preference indicator. In some embodiments, the operations can include providing the supplemental action command to the machine-to-machine device.

In some embodiments, the operations can include obtaining a network usage record, where the network usage record can identify instances of network activity by the machine-to-machine device. In some embodiments, the operations can include isolating, from the network usage record, client action records that indicate network activity associated with user input. In some embodiments, the client action records can be made available to a network service portal. In some embodiments, the operations can also include intercepting the network message. In some embodiments, intercepting the network message may occur prior to the network message reaching the target source. In some embodiments, the operations can also include releasing the network message so as to be routed to the target source. In some embodiments, the network message may be released and/or provided to the target source in response to one or more operations, such as detecting the supplemental network message from the machine-to-machine device.

It should be appreciated that the above-described subject matter may be implemented as a computer-controlled apparatus, a method as a computer process, a computing system, or as an article of manufacture such as a computer storage medium. These and various other features will be apparent from a reading of the following Detailed Description and a review of the associated drawings. Other systems, methods, and/or computer program products, according to embodiments, will be or become apparent to one with skill in the art upon review of the following drawings and detailed description. It is intended that all such additional systems, methods, and/or computer program products be included within this description, be within the scope of this disclosure.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a user interface diagram showing an example screen display for configuring aspects that facilitate activity concealment, according to an illustrative embodiment of the concepts and technologies described herein.

FIG. 2B is a user interface diagram showing another example screen display for configuring aspects that facilitate activity concealment, according to an illustrative embodiment of the concepts and technologies described herein.

DETAILED DESCRIPTION

Figure 1:
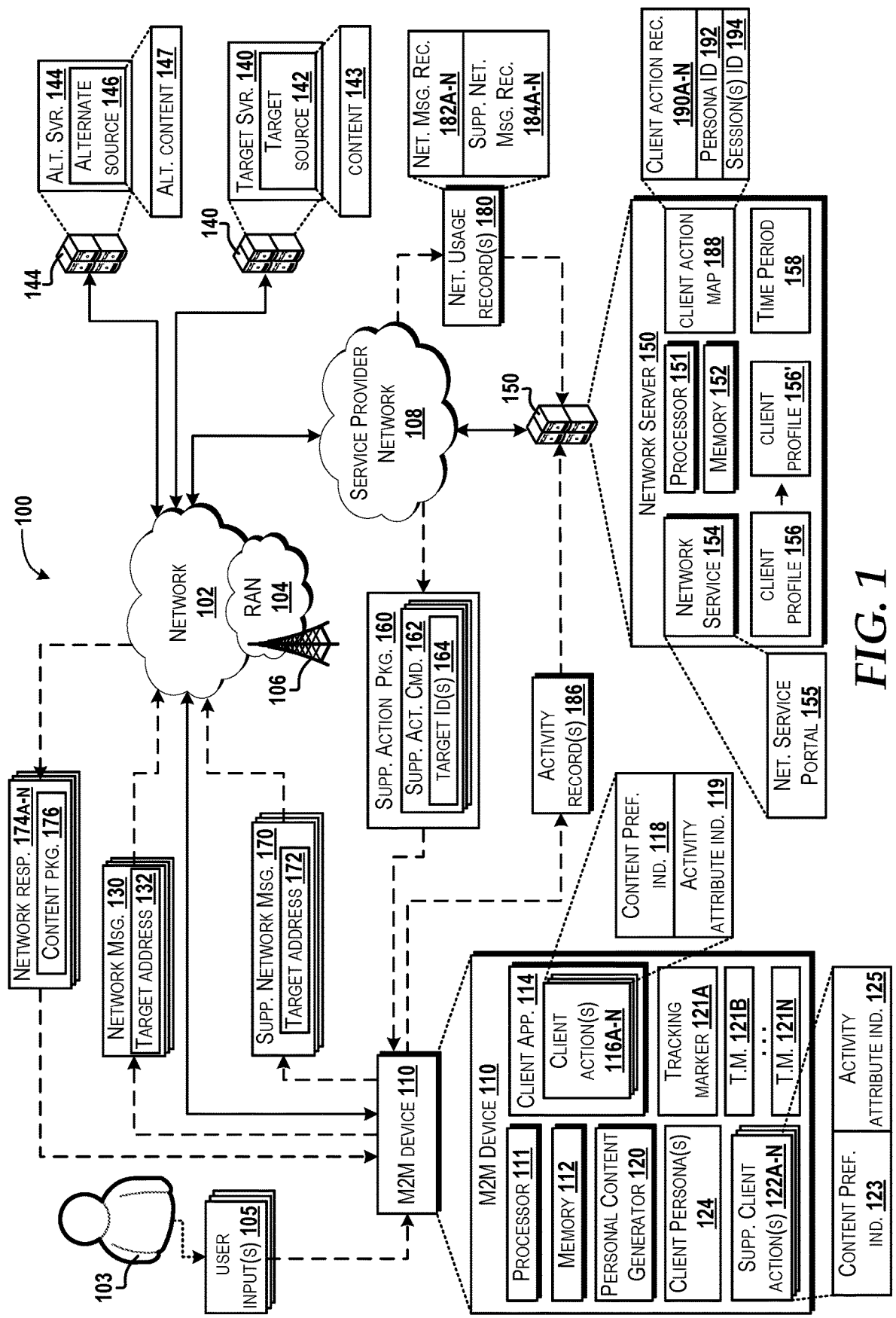
FIG. 1 is a system diagram showing an illustrative operating environment that can facilitate implementation of various embodiments of the concepts and technologies described herein.

The following detailed description is directed to web and/or network activity concealment through the use of a network service. Aspects of the concepts and technologies disclosed herein can control and/or manage the usefulness of data that is tracked by third-party websites, services, probes, and/or network intermediaries. In some instances, administrators of websites, platforms (e.g., social media platforms, media content platforms, ride sharing platforms, etc.), network services, applications, and the like, may seek to track the web activities of their users (i.e., various user equipment and devices that visit or otherwise utilize the service) so that the host can increase business opportunities through electronic advertising. In some instances, companies may provide and/or allow access to a useful online service for free or at a minimal rate in order to attract a large user base; however, many users may not realize that in exchange, the user device is providing personal data which can be stored within a user profile. The personal data may be shared with other third-parties and monetized through targeting the user with various content. Traditional attempts to limit tracking of personal user data may prevent the user from experiencing aspects of the host website and/or platform. For example, some websites will not run without cookies enabled, so the user may be forced to enable cookies in order to access the website. In another example, attempts to limit tracking of user activities may block delivery of content entirely, which may prevent proper functionality of the website and/or platform. Some companies present the user with an "opt-out" option of targeted advertising. However, the activation of the "opt-out" option may not necessarily stop the collection of user information for other purposes.

As such, aspects of the concepts and technologies discussed herein can facilitate concealment of web activity for a particular user. It is understood that the phrase "web activity" can refer to any network communication to and/or from a particular user equipment, and as such, may also be referred to as network activity. Various embodiments of the present disclosure can provide concealment of network activity without having to anonymize the network messages and/or identifier associated with the user and/or device. In various embodiments, an activity concealment service can be provided by a service provider, where the activity concealment service can be configured as a network service that is accessible to subscribing user equipment and devices. When the user provides input to a device, a client application may trigger a client action that generates a network message. As such, the client action and network message may be considered authentic and based on the activity of the user. For example, a user may provide input to a web browser to visit a website, which can correspond with a client action that launches a session tab and generates a network message directed to a target address for the target source of the content (e.g., a website host). In various embodiments, the network service can generate (and/or cause the implementation) a plurality of supplemental actions that can create a plurality of supplemented network messages so as to form a message set (which can include network messages which are authentic and the supplemental network messages which are autonomously generated on the M2M device). The network message generated from the client action (i.e., the authentic action based on user input) may be routed through a network among (e.g., interspersed among) the message set so as to hide which actions were authentic and generated corresponding to user input (i.e., client actions that generated network messages) and which actions were autonomously generated based on instructions from the network service (i.e., supplemental client actions based on the use of the personal content generator and/or the network service). Thus, the network service can conceal the authentic user interactions corresponding to the client actions from autonomous interactions corresponding to the supplemental actions. In some embodiments, aspects of the present disclosure may be implemented via an application, module, plug-in, or other computer instructions that can be locally stored on a user equipment (e.g., mobile communication device, laptop, etc.) and/or may be implemented via access to the network service. In some embodiments, the network service and/or aspects thereof may be supported by an instance of a personal content generator that can facilitate activity concealment. The personal content generator may be implemented as an executable set of instructions and executed locally on a user equipment and/or remotely in a cloud environment, such as a service provider network.

In some aspects, a user can configure the network service and/or one or more settings for generation of supplemental client actions via a user interface presented on a user equipment. For example, the personal content generator can configure the network service so as to indicate what type of supplemental content to generate, what type of activity generation processes are to be used, and/or how often to implement supplemental content generation (e.g., runtime schedule providing time of day, days of week, etc.). In some embodiments, the content that is autonomously generated by the personal content generator may include content aligned with a virtual persona (e.g., a character profile that defines attributes and/or preferences of a doctor, lawyer, philosopher, politician, etc.), supplemental content that neutralizes and/or counterpoises the user-requested content provided based on the client actions, content that is weighted to correspond to a particular subject (e.g., music, cooking, astrology, etc.), and/or content that is random (i.e., is generated without consideration of other content that the user prefers and/or is requesting). In some embodiments, the personal content generator may initiate and generate supplemental actions to create supplemental network messages that align with and/or correspond to a particular type of content. For example, instances of supplemental actions that are generated by the personal content generator can include, but should not be limited to, launching search requests via one or more session tabs on one or more web browsers; instantiating, creating, modifying, and/or removing cookies; autonomously interacting with a web page and/or application to generate interactions (e.g., impressions); requesting and/or retrieving media content; indicating a preference by selecting various preference buttons (e.g., like and/or dislike buttons on a platform, website, etc.); requesting redirects to another network address (e.g., by following web links that provide uniform resource locators); requesting streaming media content and/or downloading particular files; purging received content and data before being presented to the user; a combination thereof; and/or the like.

In various embodiments, the implementation of the supplemental actions by the personal content generator and/or network service can generate one or more instances of supplemental network messages, which in turn may be captured and tracked by intermediate and/or destination targets (e.g., the target sources of content that provide a website, webpage, platform, or the like, such as search engine providers and/or other devices that handle network communications). As such, the supplemental network messages (based on supplemental actions that were autonomously generated by the personal content generator) will be captured, tracked, and analyzed as if the supplemental network messages represented the user's preference, despite the user not directly requesting the supplemental content. For example, if the user provided input to search and retrieve content pertaining to a ukulele, then a client application may perform a client action of launching a search request for ukulele, which a target source and/or intermediate parties (e.g., web search engine providers) may interpret as the user being interested in ukuleles, thereby causing a user and/or client profile to store information indicating a preference for ukuleles that may be used in targeted electronic content solicitation and/or advertising. In various embodiments, the personal content generator may detect the client action requesting a search for the ukulele, and initiate a supplemental client action that generates a supplemental network message requesting content for a related and/or unrelated subject which the user may or may not actually be interested, such as piano or grass seed, thereby causing a user profile to attribute another preference to the user, despite the topic not actually being of interest to the user. By performing supplemental actions such as multiple searches on multiple topics, the personal content generator may neutralize, counterbalance, obfuscate, mask, and/or conceal the authentic actions triggered by the user (e.g., the client actions based on user input), which in turn can increase communication security and disrupt the implementation of a user and/or client profile for targeted content delivery.

In some embodiments, the personal content generator and/or network service may obtain and/or analyze the current state of a client profile for the user device as viewed by a web service provider and/or other intermediate party that uses the profile for targeted delivery of unsolicited content. The personal content generator and/or network service can determine what preferences are currently indicated by the client profile, and generate commands that can be implemented to evolve, reconfigure, and/or transform the client profile so as to create a new client profile (which may be a transformed client profile) that no longer aligns with the previous set of preferences. For example, supplemental actions can be triggered so that, over a defined period of time, the user equipment can generate supplemental network requests that indicate preferences which align with one or more content types and/or topics that provide a new set of preferences, which in turn are captured by intermediate providers and used to update the client profile. Over time, the client profile is transformed from an initial state to a transformed state that indicates preferences which conceal, mask, obfuscate, and/or neutralize authentic client actions (which can indicate actual user preferences by the network messages that are based on user input instead of the supplemental actions of the personal content generator). In some embodiments, the personal content generator may manipulate, create, and/or delete cookies corresponding to a particular content source (e.g., for a particular website). An instance of a cookie can include a file created by a website (or other platform and/or application) upon client visitation, where the cookie can store information about the visit on the user's device (e.g., session information that indicates length of visit, time of interactions, etc.). In various embodiments, aspects of the present disclosure can generate a plurality of supplemental network messages that do not represent a preference and/or input from the user, and therefore can build up a "haystack" of messages and information such that the user's authentic actions and preferences are made more difficult to ascertain by a third party that is not privy to the operations of the personal content generator that triggers the supplemental actions and instructs the creations of the supplemental network messages. In some embodiments, the schedule of when the personal content generator should be active can be configured according to various times and intensity levels, which in turn can vary the amount of supplemental network messages that are created so as to enable additional concealment when requested (i.e., when the network service and/or personal content generator is active), thereby allowing for the supplemental client actions to be more or less disruptive to third-parties tracking network activity of a user device. In various embodiments, the network service may be privy to which actions are authentic and correspond to client actions based on user input versus supplemental actions that are autonomously generated so as to conceal the client actions. The network service may provide a network service portal that enables subscribers to access and/or identify which network messages represent actions based on user input (which reflect authentic preferences of the user). These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that can cause a processor to perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing concealment of activity across a network will be described, according to an illustrative embodiment. The operating environment 100 shown in FIG. 1 includes a communications network ("network") 102, a radio access network ("RAN") 104, a service provider network 108, a machine-to-machine device ("M2M device") 110, a network server 150, a target server 140, and an alternate server 144. The network 102 can communicatively couple and/or be in communication with one or more computing systems and/or devices, such as but not limited to, one or more instances of the M2M device 110, the network server 150, the target server 140, the alternate server 144, and/or any other network device. In some embodiments, the network 102 can include one or more of a radio access network, an evolved packet core network, a core network, an IP-based network, a transport network, an optical transport network, a circuit switched network, such as publicly switched telephone network ("PSTN"), a cellular network, a mobile Wide Area Network, the internet, a combination thereof, or the like. In some embodiments, the service provider network 108 can be associated with a communications service provider, which may provide and/or or support various communication services, functions, and/or or operations. For example, the service provider network 108 may be associated with a mobile communication service, a software-as-a-service, a platform-as-a-service, and/or communication infrastructure that hosts, supports, and/or facilitates use of various communication and network devices. In some embodiments, the operating environment 100 can include an instance of the RAN 104 that facilitates and supports wireless and/or wired communicative coupling between devices and one or more networks, such as the network 102 and/or the service provider network 108.

In some embodiments, an instance of the RAN 104 may be included within at least a portion of the network 102 and/or the service provider network 108, although this may not necessarily be the case. In some embodiments, one or more instances of the M2M device 110 may communicate with the network server 150, the target server 140, and/or any other device using a communication path that is provided by the RAN 104. In some embodiments, the operating environment 100 can include an access point 106 that can provide communicative coupling between one or more devices, such as the M2M device 110, the network server 150, the target server 140, and/or the alternate server 144. In some embodiments, the access point 106 can provide wired and/or wireless communicative coupling for network communications, and thus the access point can include, but should not be limited to, at least one of a base transceiver station, a wireless router, a femtocell, an eNode B, a NodeB, a gNodeB (i.e., an access point that supports New Radio access technology and/or standards, such as LTE Advanced, 5G, or any future standard), a multi-standard metro cell node, a customer premise edge node (e.g., an optical network terminal), network nodes, and combinations thereof that are capable of providing communication to and/or from a network, such as the network 102 and/or the service provider network 108. It should be understood that the examples provided are for illustration purposes only, and therefore should not be construed as limiting in any way.

According to various embodiments, an instance of the M2M device 110 may be provided by, but should not be limited to, one or more of a user equipment (e.g., a mobile communication device, mobile telephones, smartphones, tablet computers, etc.), server computers, desktop computers, laptop computers, smart watches, over-the-top devices, set-top boxes, vehicle computing systems (e.g., head units, vehicle telematics control unit, etc.), internet-of-things ("IoT") device (e.g., smart appliances, smart thermostats, sensors, cameras, etc.), televisions, wearable devices, other user equipment, combinations thereof, and the like. It should be understood that the functionality of the M2M device 110 can be provided by a single device, by two or more similar devices, and/or by two or more dissimilar devices. For clarity purposes only, a discussion of the operating environment 100 will be provided where an embodiment of the M2M device 110 is configured as a mobile communication device, such as smartphone. In some embodiments, the M2M device 110 can be embodied by and/or include aspects of an instance of a computing system and/or a user equipment discussed below with respect to FIG. 6 and FIG. 7, respectively. It should be understood that this embodiment is illustrative, and therefore should not be construed as being limiting in any way.

In various embodiments, an instance of the M2M device 110 can be associated with a user 103 that can provide one or more instances of user input 105. Instances of the user input 105 may be provided through physical input, audible input, and/or visual input via one or more input and/or output components, such as discussed with respect to FIG. 7. In various embodiments, the M2M device 110 can include one or more instances of a processing unit, such as a processor 111, and a memory 112. Instances of the processor 111 can be configured to include one or more aspects of a processing unit discussed with respect to FIG. 6 and/or FIG. 7. For brevity purposes, further discussion of aspects that may be included and/or embodied by a processor (e.g., the processor 111) are provided below with respect FIG. 6 and/or FIG. 7. The memory 112 can include a memory storage device that stores computer instructions. It is understood that, in the claims, use of the phrase "memory," "computer storage medium," and variations thereof does not include, and shall not be construed to cover, a wave or signal per se and/or communication media.

In various embodiments, the M2M device 110 can store one or more application programs and other computer instructions. For example, in some embodiments, the memory 112 can store a personal content generator ("PCG") 120 and a client application 114. The PCG 120 may be configured as an executable program, module, and/or set of instructions that execute on the M2M device 110 to support a network service, such as a network service 154, so as to provide various functions and operations discussed herein. Further discussion of the network service 154 is provided below. In some embodiments, the client application 114 can be provided by a web browser, a web application, a mobile application, another standalone application, a software-as-a-service, a combination thereof, or the like. Thus, it can be appreciated that an instance of the client application 114 can execute instructions to provide the functionality illustrated and described herein. For clarity purposes only, an instance of the client application 114 may be discussed as being implemented as a web browser that enables interaction with one or more websites, network services, and/or content providers, however it is understood that this may not necessarily be the case for all embodiments. It should be understood that this embodiment is illustrative, and therefore should not be construed as being limiting in any way.

In various embodiments, the client application 114 can execute and present one or more instances of a user interface to the user 103. The user 103 can provide instances of the user input 105 to the client application 114 via the user interface. The user input 105 can trigger the client application 114 to initiate and execute one or more instances of a client action, such as client actions 116A-N. A client action (e.g., one of the client actions 116A-N) refers to initiation, execution, and/or implementation of an operation by the client application 114 that causes the generation of a network message, such as a network message 130. In some embodiments, an instance of the client actions 116A-N corresponds to, or is otherwise based on, an instance of the user input 105. As such, the client actions 116A-N can indicate and/or be associated with web activity and/or preferences of the user 103. For example, in some embodiments, the user 103 may provide an instance of the user input 105 that instructs the client application 114 to obtain content, such as content 143, from a targeted source of the content, such as target source 142. The target source 142 can be provided, hosted, and/or otherwise supported by a target server, such as the target server 140, that stores and/or provides access to the content 143. The client application 114 can trigger a client action (e.g., the client action 116A) to retrieve the content 143 by initiating generation of an instance of the network message 130. The network message 130 can be configured to request an instance of the content 143 from the target source 142 for presentation on the M2M device 110. In some embodiments, an instance of a client action (e.g., each and/or any of the client actions 116A-N) can correspond to and provide a content preference indicator 118 and/or an activity attribute indicator 119. In some embodiments, an instance of the content preference indicator 118 can indicate or otherwise present an indication of a preference for a particular instance of content based on the user input 105 from the user 103. For example, in some embodiments, the content preference indicator 118 can indicate a preference based on the user input 105 that indicates a "like" or "dislike" (or any other preference indication) via a radio button (or any other user interface function) presented on a user interface of the M2M device 110. One of the client actions 116A-N may record the user input 105 as an instance of the content preference indicator 118, which in some embodiments can be included in a message that is sent via the network 102, such as included within the network message 130. In some embodiments, the content preference indicator 118 may include an inferred preference of the user 103 based on the user input 105 and/or the client actions 116A-N.

In various embodiments, an instance of a client action (e.g., any of the client actions 116A-N) can include one or more operations and/or functions provided by the client application 114, such as but not limited to, any of requesting an instance of the content 143 from the target source 142, instantiating a tracking marker, such as any of tracking markers 121A-N, associated with the target source, retrieving an instance of the content 143 from the target source 142 and/or target server 140, indicating a preference (e.g., via the content preference indicator 118) corresponding to an instance of the content 143 provided by the target source 142, navigating within a website or other web interface provided by the target source 142, another operation that causes transmission and/or exchange of a message (e.g., the network message 130) via the network 102, or the like. In some embodiments, an activity attribute indicator (e.g., the activity attribute indicator 119) can provide a tag and/or a string representing an attribute of a particular activity on the client application 114 (e.g., an instance of the activity attribute indicator 119 provides an indication of what client action was performed, a timestamp of when the particular client action occurred, and/or another indication that can be used to represent or indicate an action implemented by the client application 114). Instances of the content preference indicator 118 and/or the activity attribute indicator 119 can be used to distinguish authentic user activity that prompts instances of the network message 130 to be generated based on the user input 105 from autonomous activity provided by the PCG 120 that conceals detection of the network message 130.

In various embodiments, when the client application 114 requests and/or obtains content from a content source (e.g., the content 143 from the target server 140), the client application 114 may create, store, and/or update a tracking marker, such as any of the tracking markers 121A-N. In some embodiments, a tracking marker (e.g., any of the tracking markers 121A-N) may be configured as a cookie or other file that stores and/or records information about a session of activity between the client application 114 and another device and/or source (e.g., the target source 142 provided by the target server 140). In some embodiments, an instance of the tracking marker (e.g., any of the tracking markers 121A-N) can correspond to or otherwise be associated with one or more of the client actions 116A-N and may provide state information about messages and activity that occurred between the client application 114 and a particular content source (e.g., the target source 142). In some embodiments, a plurality of tracking markers (e.g., any of the tracking markers 121A-N) may be created and/or modified when a message is communicated to and/or from the client application 114. In some embodiments, the PCG 120 and/or the network service 154 may instantiate, modify, (re)configure, and/or delete one or more instances of a tracking marker (e.g., any of the tracking markers 121A-N) independent from a particular target that the client application 114 is sending messages to and/or receiving messages from (e.g., the target source 142 and/or the target server 140). In some embodiments, the PCG 120 and/or the network service 154 may create, reconfigure, and/or delete one or more instances of the tracking markers 121A-N so as to align with one or more supplemental client actions (discussed further below) when the M2M device 110 is offline and not receiving messages, which in turn may counterpoise the client actions 116A-N by concealing and/or altering the state information of the client application 114 when the M2M device 110 was last online, thereby giving the appearance that activity was and/or was not performed on the M2M device 110 at a specific time, when in reality, no such activity occurred. In some embodiments, state information that captures and/or identifies the client actions 116A-N performed by the client application 114 may be recorded in one or more of the tracking markers 121A-N and/or the activity attribute indicator 119. It should be understood that this embodiment is illustrative, and therefore should not be construed as being limiting in any way.

In various embodiments, the M2M device 110 can generate and transmit instances of a message, such as the network message 130, to a particular destination, such as a targeted source of content (e.g., the target source 142 provided by the target server 140). In some embodiments, the network message 130 may be configured and/or formatted so as to conform to one or more industry standard and/or technical protocols, such as but not limited to, plain text, Rich Text Formal, Hyper Text Markup Language, eXtensible Markup Language, JavaScript Object Notation, multimedia messaging service, short message service, or any other messaging standard and/or format. Instances of the network message 130 may be directed to a target address, such as the target address 132. The target address 132 can be associated with a particular destination defined and/or indicated by the M2M device 110, such as the target source 142 that is associated with the target server 140. Examples of a target address (e.g., the target address 132) may include, but should not be limited to, a Uniform Resource Locator, a Uniform Resource Identifier, an Internet Protocol address, an email address, or any other indicator associated with the targeted destination of the particular message (e.g., the network message 130). For example, in an embodiment, the target address 132 may provide a web address (e.g., in the format of a uniform resource locator) that is associated with or otherwise points to the target source 142 (which in this example may correspond to a website or other content provider). In some embodiments, the network message 130 may be configured to request content from a particular targeted destination such as, but not limited to, an instance of the content 143 from the target server 140 associated with the target source 142.

In various embodiments, an instance of the network message 130 may be generated and sent in response to the client application 114 implementing or otherwise performing one or more of the client actions 116A-N. In some embodiments, the network message 130 may include or otherwise identify one or more of the client actions 116A-N such as by including the content preference indicator 118 and/or the activity attribute indicator 119 within the network message 130. In some embodiments, a network message (e.g., the network message 130) may be provided to the access point 106 of the RAN 104, which in turn routes the network message 130 towards the intended target via the network (e.g., towards the target server 140 that is associated with the target source 142). In various embodiments, the target server 140 may be configured as one or more computer systems, such as a computer system discussed with respect to FIG. 6. In some embodiments, the target server 140 may store instances of the content 143, although this may not necessarily be the case. In some embodiments, the target server 140 may access the content 143 from another data storage device and handle the particular request in response to a network message (e.g., the network message 130). It is understood that, as used herein, the term "content" refers to one or more instances of executable and/or computer-readable data and/or instructions that can be executed and/or presented by the client application 114. In various embodiments, the target server 140 may respond to an incoming network message (e.g., the network message 130) by generating and sending a network response, such as any of network responses 174A-N. An instance of a network response (e.g., any of the network responses 174A-N) can include data that is being requested by the M2M device 110, such as a content package 176. The content package 176 can include some and/or all of the particular content being requested, such as the content 143. In some embodiments, the content package 176 may include a portion of the content 143 because the content 143 has been packetized and sent over a plurality of responses, such as two or more of the network responses 174A-N. In some embodiments, instances of the network responses 174A-N may be configured at least similar to the network message 130. It is understood that any of the network responses 174A-N may be considered to be a type of network message, and therefore the discussion above with respect to the network message 130 may be applied to the network responses 174A-N. It should be understood that this embodiment is illustrative, and therefore should not be construed as being limiting in any way.

In various embodiments, the operating environment 100 can include one or more instances of the network server 150. The network server 150 may be associated with the service provider network 108, although this may not necessarily be the case. The network server 150 can include a processor 151 and a memory 152. The network server 150 can be configured at least similar to the computer system discussed with respect to FIG. 6. The processor 151 and the memory 152 can be configured according to one or more aspects of a processing unit and a memory discussed with respect to FIG. 6 and/or FIG. 7. In various embodiments, aspects of the processor 151 and/or the memory 152 may be virtualized so as to support virtual computing, as understood by one of ordinary skill in the technology. In various embodiments, a network service, such as the network service 154, can be supported, hosted, and/or provided by one or more instances of the network server 150. The network service 154 can be associated with the PCG 120 that is installed or otherwise stored and operating on the M2M device 110. In various embodiments, the network service 154 can be configured as a software-as-a-service that is available and/or accessible to one or more instances of the M2M device 110 and/or another computer system. It is understood that the use of the term "service" is intended to correspond with one or more network operations that support handling of network communications (e.g., the network message 130, the network responses 174A-N, etc.) and performance of operations discussed herein. Therefore, any use of the term "service" in the claims shall not be construed or interpreted as being direct to, involving, or otherwise including a judicial exception (e.g., an abstract idea) or any other non-patentable subject matter. In various embodiments, the network service 154 can include one or more of an application, a program, a software module (i.e., a defined set of callable computing instructions that configure a processor to perform one more operations), a script, a routine or any other computer-executable instructions that configure a processor (e.g., the processor 151, the processor 111, or another processing unit) to perform one or more operations and/or recitations discussed herein. In various embodiments, the network service 154 may be supported across multiple instances of the network server 150, the processor 151, and/or the memory 152. It should be understood that this embodiment is illustrative, and therefore should not be construed as being limiting in any way.

In various embodiments, the network service 154 may provide and/or support an instance of the PCG 120. For example, in some embodiments, the network service 154 may communicate with the PCG 120 so as to support when the PCG 120 should implement and initiate one or more supplemental client actions, such as supplemental client action 122A-N, on the client application 114. The supplemental client actions 122A-N may be at least similar to the client actions 116A-N in that the supplemental client actions 122A-N can be implemented and performed by the client application 114. However, the supplemental client actions 122A-N are not triggered by the user input 105 indicating a request to perform an action, but rather the supplemental client actions 122A-N may be implemented and performed in response to initiation of one or more of the client actions 116A-N that generate the network message 130. The supplemental client actions 122A-N may be generated so as to conceal, counter-balance, counterpoise, mask, and/or obfuscate the occurrence of the client actions 116A-N and/or the network message 130 (which provide authentic indications of preference about the user 103, such as by the content preference indicator 118). In various embodiments, the PCG 120 and/or the network service 154 can initiate generation, performance, execution, and/or implementation of the supplemental client actions 122A-N based on detecting the client application 114 initiating one or more of the client actions 116A-N. In some embodiments, the PCG 120 may detect the initiation and/or implementation of one of the client actions 116A-N as the network message 130 is being prepared on the M2M device 110 and/or prior to the network message 130 being transmitted to its target. For example, in some embodiments, the PCG 120 may monitor an application programming interface of the client application 114. In other embodiments, the PCG 120 may be included within the client application 114, and therefore may detect one or more of the client actions 116A-N prior to the network message 130 leaving the M2M device 110 (i.e., being sent to the target server 140 associated with target source 142).

Examples of an instance of the supplemental client actions 122A-N can include, but should not be limited to, launching queries that indicate a search term and/or string that is associated and/or unassociated with any content (e.g., the content 143) requested by the network message 130; creating, (re)configuring, and/or selectively purging one or more of the tracking markers 121A-N (e.g., cookies); generating an interaction on a user interface provided by the client application 114; forcing indication of a preference (e.g., auto selection of a preference indicator, such as a like or dislike button) without user input, where the forced preference is contrary to a prior preference indication; following redirect links within the same or separate user interface window (e.g., the same or separate session tab); launching another browser window and/or tab instance so as to create a concurrent network session; requesting and/or retrieving files and/or content from the same and/or alternate target as the network message 130 (e.g., from an alternate source discussed below); purging or otherwise deleting received data and/or content (e.g., instances of the content package 176) upon being received by the M2M device 110 and prior to that data and/or content being presented for display on the M2M device 110; any combination thereof, or any other operation on the client application 114 that can generate one or more separate instances of network activity, such as a supplemental network message 170 discussed below.

In various embodiments, instances of the supplemental network message 170 can be configured at least similar to an instance of the network message 130. The supplemental network message 170 may be sent from the client application 114, and therefore externally appears at least similar or identical in format to the network message 130. Instances of the network message 130 may be generated by the client application 114 based on the user input 105 that triggers initiation of the client actions 116A-N, while the supplemental network message 170 may be generated by the PCG 120 instructing the client application 114 to initiate one or more of the supplemental client actions 122A-N, which in turn causes the generation of one or more of the supplemental network message 170. As such, the supplemental network message 170 may be configured using the same and/or similar protocol and/or standard as the network message 130. As the network message 130 and/or the supplemental network message 170 are being routed through the network 102 (or any other network such as the RAN 104 and/or the service provider network 108), they may appear to have both been generated based on the user input 105 and thus both indicate preferences that are authentic to the user 103, when in reality, only instances of the network message 130 may represent authentic user preferences based on the user input 105. In some embodiments, a plurality of instances of the supplemental network message 170 may be sent before and/or after the network message 130 so as to conceal, obfuscate, and/or mask which communications correspond with network activity that is authentic to the user 103. In some embodiments, the PCG 120 may detect the generation of the network message 130 and instruct the client application 114 to withhold sending the network message 130 until the supplemental network message 170 is generated, and in turn the supplemental network message 170 may be transmitted to its intended target prior to the network message 130 being transmitted, thus giving the appearance (albeit falsely) that the supplemental network message 170 conveys authentic preferences of the user 103.

In various embodiments, the supplemental network message 170 can be directed to a particular target destination that is the same and/or different than the target indicated in the network message 130. For example, instances of the supplemental network message 170 can include a target address 172. The target address 172 may have a configuration that is the same or at least similar to the target address 132 discussed above. In some embodiments, the supplemental network message 170 requests another instance of content from the target source 142, and therefore the target address 172 may correspond to the target server 140 and/or the target source 142. In some embodiments, the supplemental network message 170 may include the target address 172 that is directed to an alternate source, such as an alternate source 146. In some embodiments, the alternate source 146 may be supported, provided, and/or hosted by an alternate server, such as the alternate server 144, however this may not necessarily be the case for all embodiments. It is understood that the alternate server 144 may be configured according to an embodiment of a computer system discussed below with respect to FIG. 6. The alternate source 146 can include another website, platform, and/or service that is separate from the target source 142.

In various embodiments, the alternate source 146 can provide instances of content that can be presented on the client application 114 of the M2M device 110, such as alternate content 147. The alternate content 147 provided by the alternate source 146 may be similar and/or different than the content 143 provided by the target source 142. For example, in some embodiments, the target source 142 may correspond to a website for a first hardware retailer, while the alternate source 146 may correspond to a website for another hardware retailer that is a competitor to the first hardware retailer. In other embodiments, the alternate source 146 may be unrelated to the products, services, and/or content provided by the target source 142, such as the alternate source 146 being a portal to a streaming media platform, while the target source 142 provides listings of automobiles for sale. In various embodiments, when the intended target of the supplemental network message 170 receives the supplemental network message 170 (e.g., the target server 140 and/or the alternate server 144), the content that is being requested may be provided to the M2M device 110 in the form of an instance of one of the network responses 174A-N. For example, if the target address 172 points to the alternate source 146, then the alternate server 144 may retrieve the alternate content 147 and prepare an instance of a network response (e.g., one of the network response 174A-N) to create an instance of the content package 176 that includes at least some of the alternate content 147. It is understood that the alternate content 147 is not necessarily a substitute for the content 143, but rather provides content that can mask, counter-balance, conceal, and/or counterpoise one or more preferences of the user 103 (where the user preferences may be represented by the content preference indicator 118 and/or the activity attribute indicator 119). In various embodiments, instances of the supplemental client actions 122A-N can include or otherwise correspond to a content preference indicator 123 and/or an activity attribute indicator 125. An instance of the supplemental network message 170 can include the content preference indicator 123 and/or the activity attribute indicator 125. The content preference indicator 123 can provide an inauthentic indication of preference for the user 103. The activity attribute indicator 125 can provide an indication of what type of supplemental client action (e.g., corresponding to one of the supplemental client actions 122A-N) was performed to generate the supplemental network message 170 (e.g., launching a query, generating an impression, following a redirect link, etc.).

In some embodiments, one or more instances of the supplemental client actions 122A-N may be based on one or more definitions from a client persona 124. The client persona 124 can be configured as a computer readable file that is accessible to the PCG 120 and may be stored on the M2M device 110 and/or in another location, such as the memory 152 of the network server 150. The client persona 124 may represent a virtual character that can indicate alternate preferences (which are inauthentic to the actual user 103) that can be used to offset, counter-balance, counterpoise, conceal, mask, and/or obfuscate the authentic preferences of the user 103. In some embodiments, the client persona 124 can include an index of keywords, phrases, and/or character strings that can be associated with or otherwise convey a preference for one or more activities of the virtual character. For example, an instance of the client persona 124 may be configured to represent a doctor, a lawyer, a professional bowler, a pottery artist, a skateboarder, or any other character that may be associated with one or more preferences. As such, the client persona 124 can list possible search terms, preferences, and actions that would cause the supplemental client actions 122A-N to convey inauthentic preferences (i.e., appear as though the user 103 was providing input that indicates a preference when in reality the user 103 may or may not have any interest in attributes and/or preferences associated with the virtual character of the client persona 124). In some embodiments, the client persona 124 may be associated with a persona identifier 192, which can be provided to the network service 154 when the PCG 120 implements one or more of the supplemental client action 122A-N such that the content preference indicator 123 corresponds to a preference provided by the client persona 124. It should be understood that this embodiment is illustrative, and therefore should not be construed as being limiting in any way.

In some embodiments, the PCG 120 may detect one or more of the client actions 116A-N and/or the network message 130, and in response, may identify the target of the network message 130 (e.g., the target source 142). In some embodiments, if an instances of the client persona 124 is activated, then the PCG 120 may identify the client persona 124, such as by extracting the persona identifier 192. In various embodiments, the PCG 120 may inform the network service 154 that one or more instances of the client actions 116A-N is being (and/or has been) initiated and/or an instance of the network message 130 is generated. In some embodiments, the PCG 120 may provide one or more instances of information to the network service 154 so as to inform or otherwise allow the network service 154 to detect the client actions 116A-N and/or the network message 130. For example, in some embodiments, the PCG 120 may send, to the network service 154, any of the activity attribute indicator 119, the content preference indicator 118, the persona identifier 192, and/or the target address 132 associated with the target source 142 indicated by the network message 130.

In various embodiments, instances of the supplemental client actions 122A-N that are initiated, and instances of the supplemental network message 170 that are sent, can be based on the type of client action that is initiated, the intended target of the network message 130 (e.g., the target source 142), and/or the particular content being requested by the network message 130 (e.g., the content 143). To determine what supplemental client action should be initiated, in some embodiments, the PCG 120 may request, from the network service 154, commands that indicate what supplemental client actions should be performed and/or the network address that should be used in one or more supplemental network messages. For example, in some embodiments, the PCG 120 may generate and transmit an activity record 186 to the network service 154, where the activity record 186 can inform the network service 154 of the one or more client actions 116A-N implemented by the client application 114 and/or request what supplemental client action should be implemented to counter balance, conceal, counterpoise, mask, obfuscate, and/or neutralize the client action that was performed by the client application 114. In some embodiments, instances of the activity record 186 can be used to inform the network service 154 of which messages being sent from the M2M device 110 are based on user input 105 (i.e., which messages are generated in response to client actions 116A-N that are based on the user input 105), and thus are considered authentic activity corresponding to the user 103. Therefore, in some embodiments, the network service 154 can analyze the activity record 186 to determine that instances of the network message 130 correspond to the client actions 116A-N and the user input 105, while instances of the supplemental network message 170 correspond to the supplemental client actions 122A-N and are independent from the user input 105 (i.e., do not provide an authentic indication of a preference or activity of the user 103). In some embodiments, the activity record 186 may include information pertaining only to the network message 130 and the client actions 116A-N, which in turn can enable the network service 154 to distinguish messages that are based on user input 105 (i.e., the network message 130) from messages that are autonomously generated by the PCG 120 and do not provide authentic indications of user preference (i.e., instances of the supplemental network message 170).

In some embodiments, the network service 154 can analyze information provided by the M2M device 110 regarding the client actions 116A-N and the network message 130 (along with any other information provided by the M2M device 110, such as but not limited to, the target address 132 that can be used to identify the target source 142, the content preference indicator 118, the activity attribute indicator 119, the persona identifier 192, etc.). In some embodiments, the network service 154 can detect an instance of the network message 130 by monitoring a network (e.g., the network 102, the RAN 104, and/or the service provider network 108) and/or by analyzing information received from the M2M device 110 (e.g., the activity record 186 or other information from the PCG 120 as discussed above). The network service 154 can identify an instance of the client actions 116A-N performed by the client application 114 and/or identify the target source 142 that is the intended destination of the network message 130. In various embodiments, the network service 154 can generate a supplemental action command, such as one or more instance of a supplemental action command 162. In various embodiments, generating an instance of the supplemental action command 162 can counterpoise the one or more instance of client action (e.g., any of the client actions 116A-N) implemented by the client application 114 on the M2M device 110. Stated differently, the network service 154 (and/or the PCG 120 on the M2M device 110) can counterpoise any of the client actions 116A-N (along with any corresponding message, such as the network message 130) by an instance of a supplemental action (e.g., any of the supplemental actions 122A-N). In some embodiments, the network service 154 triggers the supplemental action to be implemented by generating an instance of the supplemental action command 162. In some embodiments, the PCG 120 may, independent of and/or in conjunction with the network service 154, generate an instance of the supplemental action command 162 and/or trigger the execution and/or implementation of a supplemental action on the M2M device 110. In various embodiments, the phrase "counterpoising a client action" or variants thereof, refers to neutralizing, balancing, concealing, and/or mitigating any preference indicated by (and/or which could be inferred from) the network message 130 and/or indicated by the performance, implementation, execution, and/or occurrence of a client action (any of the client actions 116A-N), where the preference is captured by the network message 130 and would be subsequently indicated and/or otherwise recorded in a user profile (e.g., the client profile 156). As such, a client action and/or the network message 130 indicating a preference can be counterpoised by using, implementing, executing, and/or triggering a supplemental client action so as to generate and transmit an instance of the supplemental network message 170, where the supplemental network message 170 indicates a preference (e.g., via the content preference indicator 123) that neutralizes, balances, conceals, and/or mitigates the authentic preference provided by the client action and/or the network message 130 (e.g., content preference indicator 118 that is included in the network message 130). In some embodiments, an instance of the supplemental action command 162 can instruct the M2M device 110 (e.g., specifically the client application 114) to initiate or otherwise implement one or more instance (i.e., a plurality) of a supplemental client action, such as any of the supplemental client actions 122A-N discussed above. In various embodiments, the supplemental action command 162 can be configured to instruct the client application 114 to generate at least one instance of the supplemental network message 170 by implementing one of the supplemental client actions 122A-N. In some embodiments, the supplemental action command 162 can instruct the client application 114 to implement a plurality of supplemental client actions (e.g., a plurality of the supplemental client actions 122A-N), and thus in turn generate a plurality of instances of the supplemental network message 170. By this, a plurality of messages may be generated and sent from the M2M device 110, where the network message 130 (which indicates an authentic preference for the content 143 based on the user input 105) may be concealed amongst the plurality of messages transmitted from the M2M device 110 (i.e., the network message 130 may be transmitted among the plurality of instance of supplemental network messages 170). In some embodiments, an authentic preference of the user 103 may be provided (and/or captured and indicated) by a first content preference indicator (e.g., the content preference indicator 118) and an inauthentic preference of the user 103 (e.g., caused by one or more of the supplemental client actions 122A-N that was autonomously triggered by the PCG 120 and/or the network service 154, but not triggered by any input from the user 103) may be provided (and/or captured and indicated) by a second content preference indicator (e.g., the content preference indicator 123). In some embodiments, the content preference indicator 123 may be referred to as an inauthentic content preference indicator and/or an inauthentic preference indicator because the preference which is indicated and/or implied is a result of one or more of the supplemental client actions 122A-N that were autonomously generated so as to counterpoise (i.e., neutralize, counter-balance, obfuscate through confusion, and/or contradict) the authentic preference. As such, in some embodiments, the client profile 156 can be transformed so that any authentic preferences recorded therein are neutralized by the inauthentic preferences, and/or can be concealed by a barrage of supplemental network messages that provide inauthentic preferences that collectively indicate an overall (i.e., majority) indicator towards an inauthentic preference for a particular content and/or activity.

In various embodiments, the supplemental action command 162 can include a target identifier 164. An instance of the target identifier 164 can provide an address and/or identity of the intended target to which the supplemental network message 170 should be directed. For example, the target identifier 164 may be configured to provide a uniform resource locator that is associated with the target source 142 and/or the alternate source 146. In some embodiments, if the target address 132 of the network message 130 is directed to the target source 142 to obtain the content 143, then the target identifier 164 may correspond to the alternate source 146 so as to indicate a preference (albeit an inauthentic preference) for the alternate content 147, where the supplemental network message 170 can configure the target address 172 to indicate the target identifier 164 (which in this example points to the alternate source 146). In some embodiments, the network service 154 may generate a supplemental action package 160 that can be used to deliver instances of the supplemental action command 162. In some embodiments, the supplemental action package 160 can be directed to the PCG 120, which in turn can instruct the client application 114 to execute the supplemental action command 162 by implementing one or more of the supplemental client actions 122A-N.

In various embodiments, the service provider network 108 may provide and/or make available a profile that is associated with a device of the user 103, such as a client profile 156. The client profile 156 may be associated with the M2M device 110 that corresponds to the user 103. The client profile 156 can indicate preferences of the user 103 based on network activity that is detected and/or identified using various messages from the M2M device 110 (e.g., any of the network message 130, the supplemental network message 170, and/or the network response 174A-N). In some embodiments, the client profile 156 may be generated and updated based on usage records associated with the M2M device 110, such as network usage records 180. In some embodiments, any network activity that involves communications (e.g., any of the network message 130, the supplemental network message 170, and/or the network response 174A-N) passing through a network (e.g., the network 102, the RAN 104, and/or the service provider network 108) may be recorded by the network usage records 180.

The network usage records 180 can provide a history and record of network activity. For example, the network usage records 180 can include network message records 182A-N and supplemental network message records 184A-N. An instance of the network usage record 180 may be generated when an instance of the network message 130 is transmitted and routed through a network (e.g., the network 102, the RAN 104, and/or the service provider network 108). An instance of a supplemental network message record (any of the supplemental network message records 184A-N) may be generated when an instance of the supplemental network message 170 is transmitted and routed through a network (e.g., the network 102, the RAN 104, and/or the service provider network 108). In various embodiments, the client profile 156 may be updated based on information included in the network usage records 180 and/or information included in the messages that are transmitted through a network (e.g., any of the network message 130, the supplemental network message 170, and/or the network response 174A-N). In some embodiments, the client profile 156 can include instances of the content preference indicator 118 that is based on the client actions 116A-N that generated the network message 130.

In some embodiments, the network service 154 can transform or otherwise reconfigure the client profile 156 by instructing the client application 114 to implement the supplemental client actions 122A-N and generate instances of the supplemental network message 170. For example, initially, the client profile 156 may have been generated and may reflect authentic activity and preferences of the user 103 because the client profile 156 may have been configured using only instances of the network message 130, and therefore may reflect authentic activity and preferences of the user 103. However, the network service 154 can indirectly reconfigure and/or transform the client profile 156 into a transformed client profile, which is illustrated in FIG. 1 as client profile 156'. The network service 154 can provide the M2M device 110 with the supplemental action commands 162, which in turn can cause the execution and implementation of the supplemental client actions 122A-N by the client application 114, and the generation and transmission of one or more instances of the supplemental network message 170. As instances of the supplemental network message 170 passes through the network 102 (or any other network accessible that can be used), an instance of the network usage records 180 may instantiate one of the supplemental network message records 184A-N.

The client profile 156 may be updated using the instances of the content preference indicator 123 corresponding to the supplemental client actions 122A-N and the supplemental network message 170. In some embodiments, the content preference indicator 123 may be included in the supplemental network message records 184A-N. Over a defined time period, such as time period 158, the client profile 156 can be transformed into the client profile 156' which reflects the additional preferences (albeit inauthentic) indicated by the instances of the supplemental network message 170 (where the inauthentic preferences may be provided b instances of the content preference indicator 123). By this, the authentic preferences (which can be provided by instances of the content preference indicator 118) may be concealed and obfuscated through indirect reconfiguration of the client profile 156. Although the client profile 156 is illustrated as being within the network server 150, it is understood that a third-party may maintain and/or provide, generate, and update the client profile 156, and therefore the network service 154 may not necessarily directly manipulate and reconfigure the client profile 156 through direct access and reconfiguration, but rather accomplish transformation indirectly through instructing the generation of instances of the supplement network message 170. In some embodiments, the network service 154 can be configured so as to define the length of time that the time period 158 should span so as to indirectly reconfigure the client profile 156. Specifically, the shorter the time period 158, the more instances of the supplemental network message 170 is generated and transmitted from the M2M device 110 so as to transform the client profile 156 into the client profile 156' more expeditiously.

In various embodiments, the network service 154 may provide and/or support a network service portal 155. The network service portal 155 can provide and present a user interface that enables a subscriber to interact with the network service 154. For example, a computer system and/or device may launch and/or access the network service portal 155, which may be configured as a website or any other network accessible user interface. In some embodiments, the network service portal 155 can enable a subscribing device to query, obtain, analyze, and/or review network records and activity pertaining to the M2M device 110. Specifically, the network service portal 155 can enable identification of what messages and network activity correspond with authentic preferences of the user 103. The network service portal 155 can filter or otherwise isolate the network message records 182A-N so that the client actions 116A-N and/or the network message 130 can be distinguished as authentic activity of the user 103 (and thus based on user input 105).

In some embodiments, the network service 154 can create a client action map 188. The client action map 188 can include one or more instances of client action records 190A-N that identify the client actions 116A-N corresponding to the instances of the network message 130 that provide authentic user preferences. In some embodiments, the client action records 190A-N may point to the network message records 182A-N of the network usage records 180. This can improve the processing speed and allow for improved resource efficiency of the network server 150 because the network service portal 155 can enable search of specific client actions 116A-N and the client action records 190A-N without having to spend query time searching through the supplemental network message records 184A-N and/or the supplemental network message 170 (which would provide inauthentic preferences). The network service portal 155 can allow a subscriber access to the network service 154 so that the client actions 116A-N can be distilled from the supplemental client actions 122A-N, specifically by providing access to the client action map 188 that identifies the client action records 190A-N as authentic network activity of the M2M device (i.e., network activity in the form of the network message 130 that was initiated based on user input 105 as opposed to autonomous initiation of the supplemental client actions 122A-N by the PCG 120 which generated the supplemental network message 170). By this, a subscriber device can be presented with network activity of the M2M device 110 that indicates or otherwise identifies authentic preferences and network activity (e.g., via presentation of the content preference indicator 118 and/or the activity attribute indicator 119). The client action map 188 can point to the client action records 190A-N that identify the usage records which were caused by user input 105 (e.g., pointing only to the network message records 182A-N recorded in the network usage records 180). In some embodiments, the client action map 188 can include one or more instances of the persona identifier 192 so as to indicate which instance of the client persona 124 was in effect on the M2M device 110 at a particular time, such as during the time period 158. In some embodiments, the client action map 188 can include a session identifier 194. The session identifier 194 can provide an identification of one or more of the client actions 116A-N that occurred during a particular session instance of the client application 114, and thus the client actions 116A-N may be associated with each other. It is understood that the examples provided are for illustration purposes only, and therefore should not be construed as limiting in any way.

It is understood that FIG. 1 illustrates one or more instance of the network 102, the user 103, the RAN 104, the user input 105, the access point 106, the service provider network 108, the M2M device 110, the processor 111, the memory 112, the client application 114, the client actions 116A-N, the content preference indicator 118, the activity attribute indicator 119, the PCG 120, tracking markers 121A-N, the supplemental client actions 122A-N, the content preference indicator 123, the activity attribute indicator 125, the network message 130, the target address 132, the target server 140, the target source 142, the content 143, the alternate server 144, the alternate source 146, the alternate content 147, network server 150, the processor 151, the memory 152, the network service 154, the network service portal 155, the client profile 156, the client profile 156', the time period 158, the supplemental action package 160, the supplemental action command 162, the target identifier 164, the supplemental network message 170, the target address 172, the network responses 174A-N, the content package 176, the network usage records 180, the network message records 182A-N, the supplemental network message records 184A-N, the activity records 186, the client action map 188, the client action records 190A-N, the persona identifier 192, and the session identifier 194. It should be understood, however, that various implementations of the operating environment 100 can include zero, one, or more than one of these elements of the operating environment 100 shown in FIG. 1. It is understood that use of the term "N" refers to an arbitrary number of instances that may vary depending on how many instances of that component or element are in existence. As such, the illustrated embodiment of the operating environment 100 should be understood as being illustrative and should not be construed as being limiting in any way.

Turning now to FIGS. 2A-2B, with continued reference to FIG. 1, various instances of a user interface ("UI") diagram showing an example screen display for configuring aspects that facilitate activity concealment will be discussed, according to an illustrative embodiment of the concepts and technologies described herein. Specifically, FIG. 2A shows an example screen display 200 and FIG. 2B shows an example screen display 220. For clarify purposes, a discussion of FIG. 2A will be provided first, followed by a discussion of FIG. 2B. As illustrated in FIG. 2A, a user equipment 202 can present a user interface 204A to a user, such as the user 103. In various embodiments, the user equipment 202 can be configured as an instance of the M2M device 110. The user equipment 202 can present the user interface 204A by executing the PCG 120 and/or by accessing the network service 154, such as via the network service portal 155. In some embodiments, the PCG 120 can provide a configuration and/or settings menu that presents a variety of options for configuring the PCG 120 and/or the network service 154. For example, in some embodiments, the user equipment 202 may present a settings button 206, and upon selection, a drop down sub-menu may be presented with potential options for configuration of the PCG 120 and/or the network service 154. For example, in some embodiments, the setting button 206 may provide a content generation types button 208, a supplemental action types button 210, and a content generation schedule button 212. It should be understood that the examples provided are for illustration purposes only, and therefore should not be construed as limiting in any way.

Turning now to FIG. 2B, a screen display 220 shows the user equipment 202 that can present another instance of a user interface 204B. The user interface 204B can present and include the content generation types button 208, the supplemental action types button 210, and/or the content generation schedule button 212. In some embodiments, selection of one or more of the buttons can present possible options for configuration of the PCG 120 and/or the network service 154 so as to conceal network activity on the M2M device 110. For example, in some embodiments, selection of the content generation types button 208 can present options 209A-N, where each option can correspond with a type of content generation. The types of content generation can indicate how instances of the supplemental network message 170 should be configured and implemented so as to provide concealment of network activity, specifically concealing instances of the network message 130 and any preference that can be inferred therefrom (e.g., from the content preference indicator 118). For example, the content generation types can include, but should not be limited to, gradual conformance (e.g., providing iterations of the supplemental network message 170 so that the client profile 156 is gradually conformed to a targeted preference, such as provided by the client persona 124), random generation (e.g., the client application 114 generating instances of the supplemental network message 170 at random times and/or with requests for randomly selected content and/or having randomly selected preference indications), offset content preference (e.g., determining the authentic preference and generating a supplemental network message that indicates a lesser amount of interest in the same content type and/or subject so as to offset the intensity of the user preference), content alignment (e.g., generating supplemental network messages so that the client profile is aligned to a specific genre, category, and/or niche preference for a certain type of content), counterpoise and/or neutralize (e.g., generating supplemental network messages so as to provide a counterbalance and neutralize the authentic preference indicated by the network message 130 and the user input 105, such as by configuring the supplemental network message such that a preference indicated by the network message 130 is negated or otherwise neutralized and/or have a plurality of supplemental messages that collectively provide a neutral preference so as to mask the authentic preference of the user 103 and the user input 105), concurrent generation (e.g., withholding delivery of the network message 130 until the supplemental network message is generated in a separate session so as to enable concurrent generation and/or delivery of the messages), ad hoc generation (e.g., generating supplemental network messages in a manner that does not have a detectable pattern and/or interval, and thus occurs in an ad hoc manner), and/or interspersed (e.g., configuring transmission of the supplemental network messages such that delivery of the network message is interspersed between two or more instances of a supplemental network message). It should be understood that the examples provided are for illustration purposes only, and therefore should not be construed as limiting in any way.

The user interface 204B can present and include the supplemental action types button 210 that, upon selection, can present possible options 211A-N for supplemental client actions (e.g., the supplemental client actions 122A-N). The options 211A-N corresponding to the supplemental client actions can include, but should not be limited to, launching queries, creating and/or (re)configuring tracking markers, generating interactions (e.g., impressions on a website), forcing indication of a preference, following redirect links provided by the client application 114, launching a browser and/or tab session instance, downloading or otherwise retrieving data files and/or content, purging content and/or data prior to presentation of the content and/or data, and/or a collection of supplemental client actions that collectively provide a combined action set through the generation of a plurality of supplemental network messages. It should be understood that the examples provided are for illustration purposes only, and therefore should not be construed as limiting in any way.

The user interface 204B can present and include the content generation schedule button 212 that, upon selection, can present possible options 213A-N for configuring runtime intervals. For example, in some embodiments, the options can include, but should not be limited to, configuring the time of day, day of the week, enabling ad hoc generation of supplemental network messages when concealment of network activity is requested by the user 103, user activity based such that whenever the client application 114 is used and the client actions 116A-N are implemented, and configuring or otherwise setting an intensity level of supplemental network messages so as to enable a "light" amount of supplemental network messages (i.e., less than a defined amount, such as no more than the number of network messages sent) or allow for "bombardment" of supplemental network message (i.e., where the number of supplemental network messages outnumbers—such as by an order of magnitude—the network message indicating an authentic preference). It should be understood that the examples provided are for illustration purposes only, and therefore should not be construed as limiting in any way.

It should be appreciated that the UI diagrams illustrated in FIGS. 2A-2B are provided for illustration purposes to provide one contemplated example of the UIs that can be generated and/or displayed in accordance with the concepts and technologies disclosed herein, and therefore should not be construed as being limited in any way. The buttons, controls, displays, and/or other information shown in the embodiments of screen displays 200 and 220 are illustrative and can include various menus, options, fields, buttons, or other information not shown in FIGS. 2A-2B. Because additional or alternative buttons and information can be included in the screen displays 200 and 220, it should be understood that the example embodiments shown in FIGS. 2A-2B are illustrative and therefore should not be construed as limiting in any way.

Figure 2C:
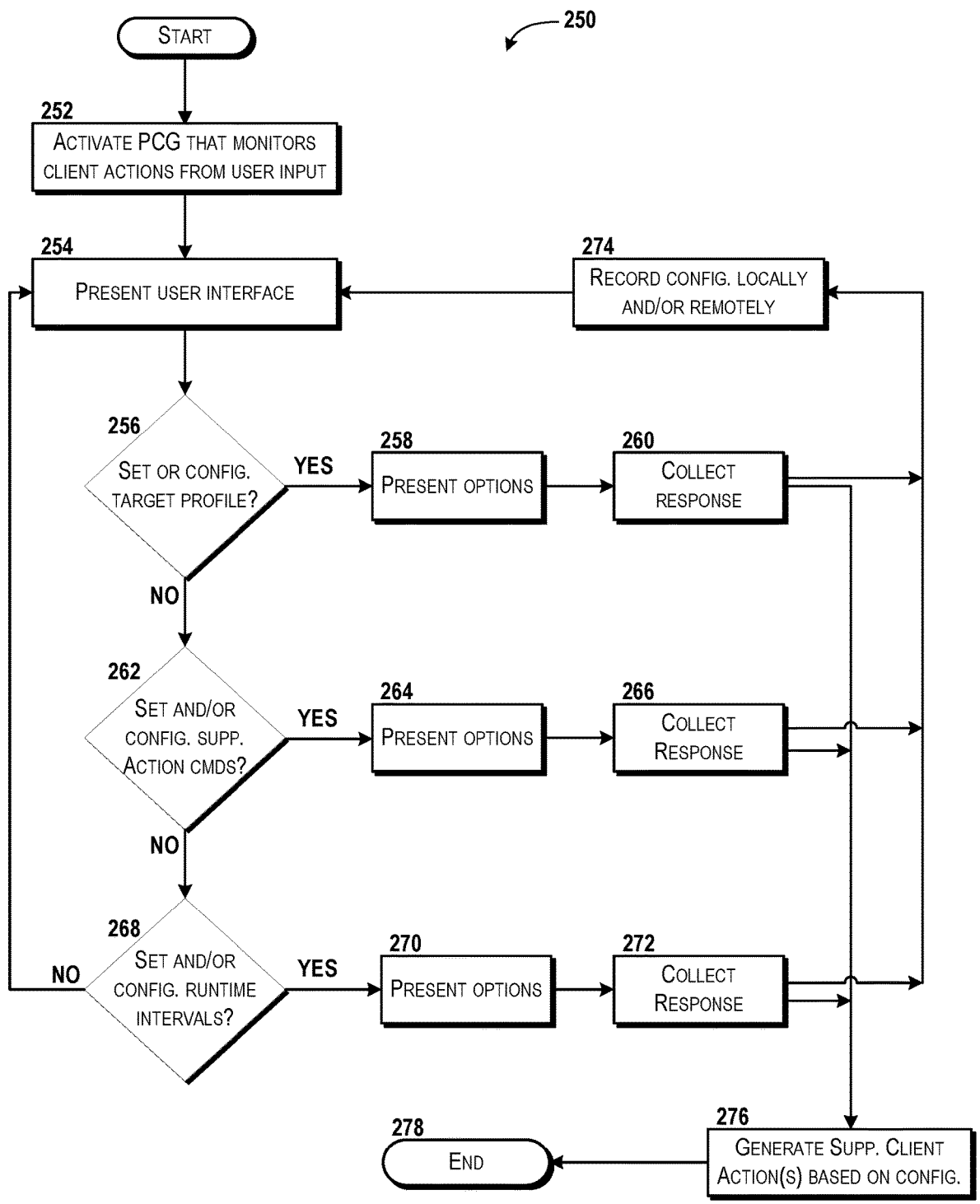
FIG. 2C is a flow diagram showing a method for activating and configuring aspects of activity concealment with a network service, according to an illustrative embodiment of the concepts and technologies described herein.
Figure 3A:
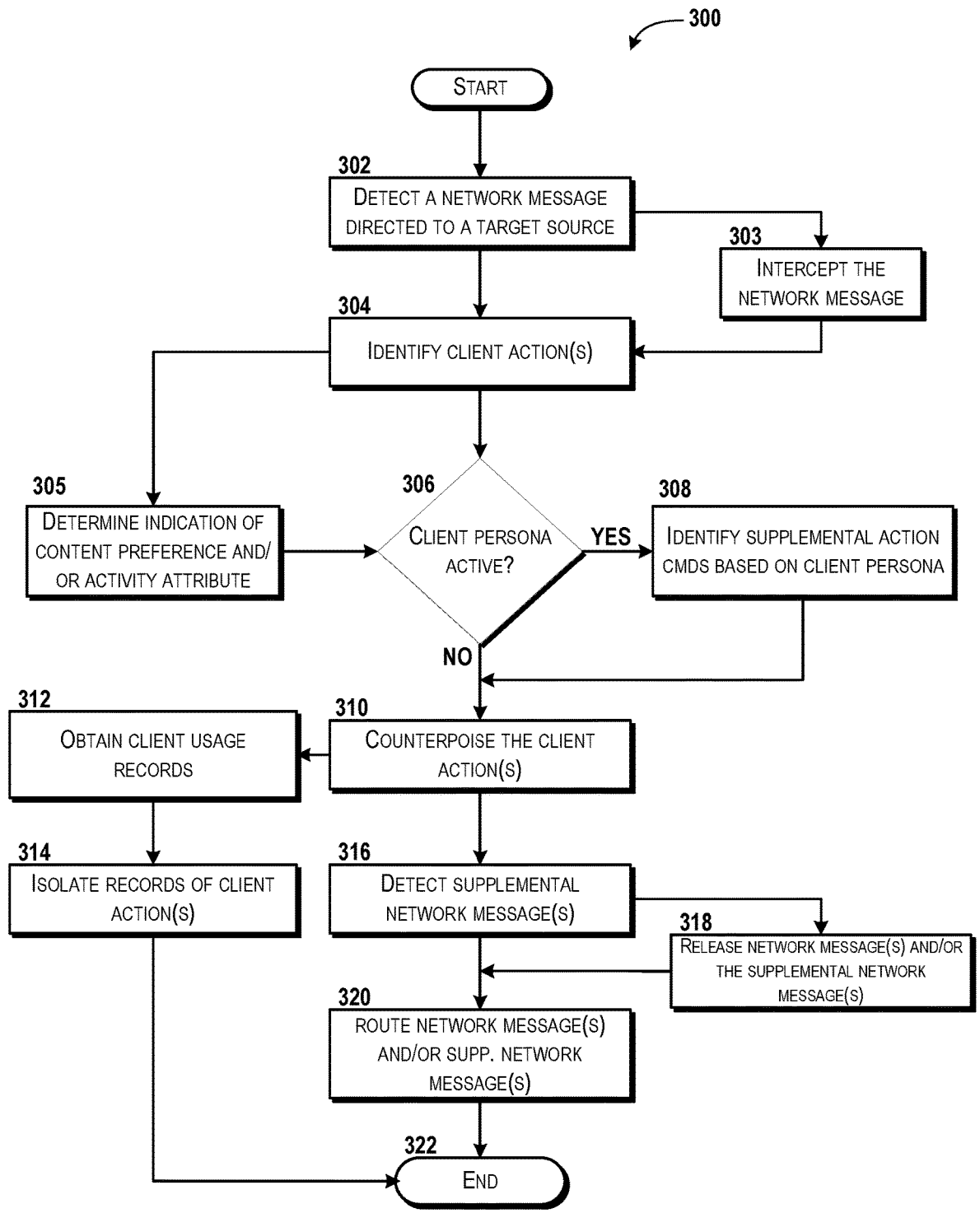
FIG. 3A is a flow diagram showing aspects of a method for facilitating generation of supplemental network messages for activity concealment using a network service, according to an illustrative embodiment of the concepts and technologies described herein.
Figure 3B:
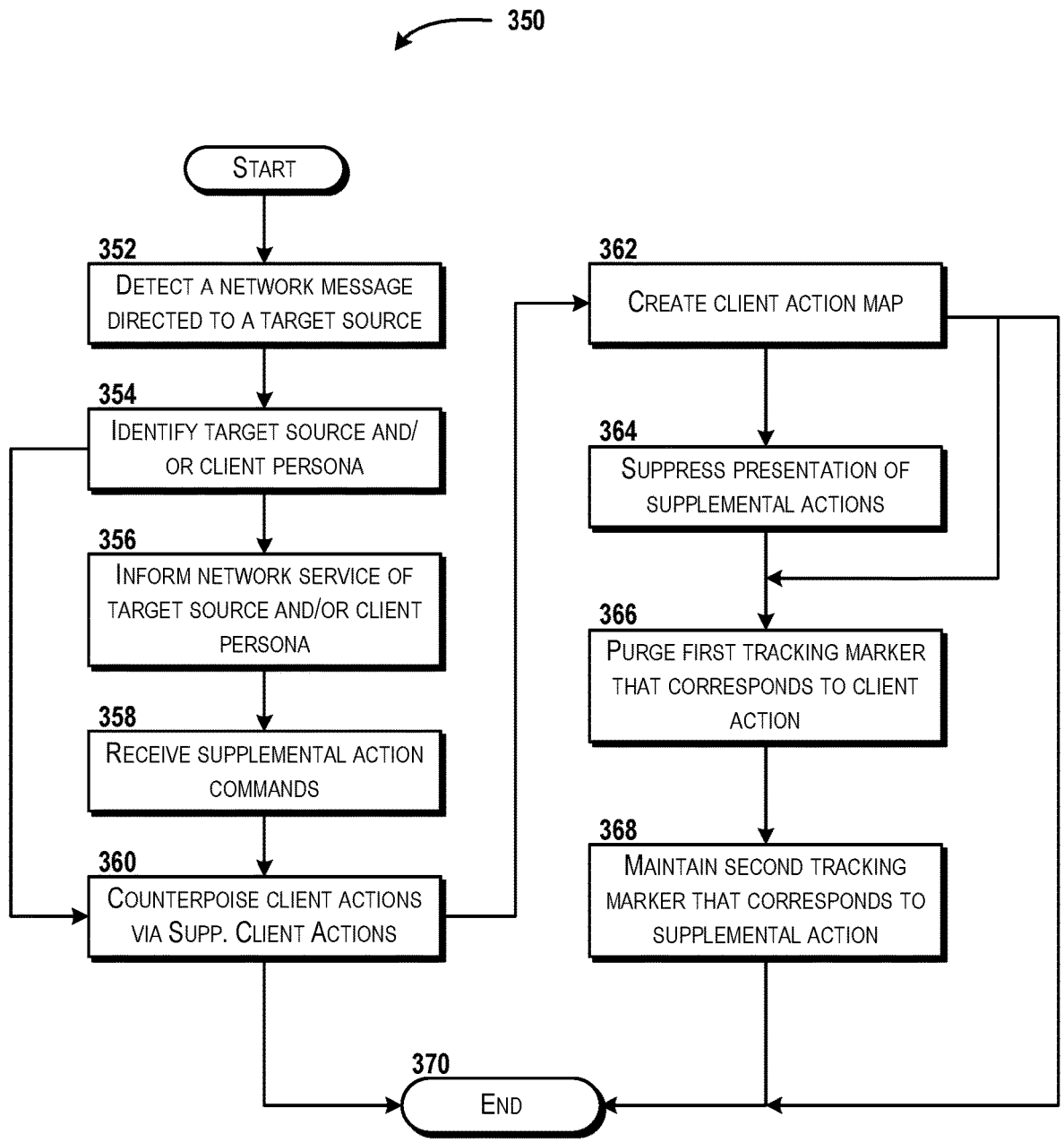
FIG. 3B is a flow diagram showing aspects of a method for providing activity concealment on a machine-to-machine device that can use a network service, according to an illustrative embodiment of the concepts and technologies described herein.
Figure 4:
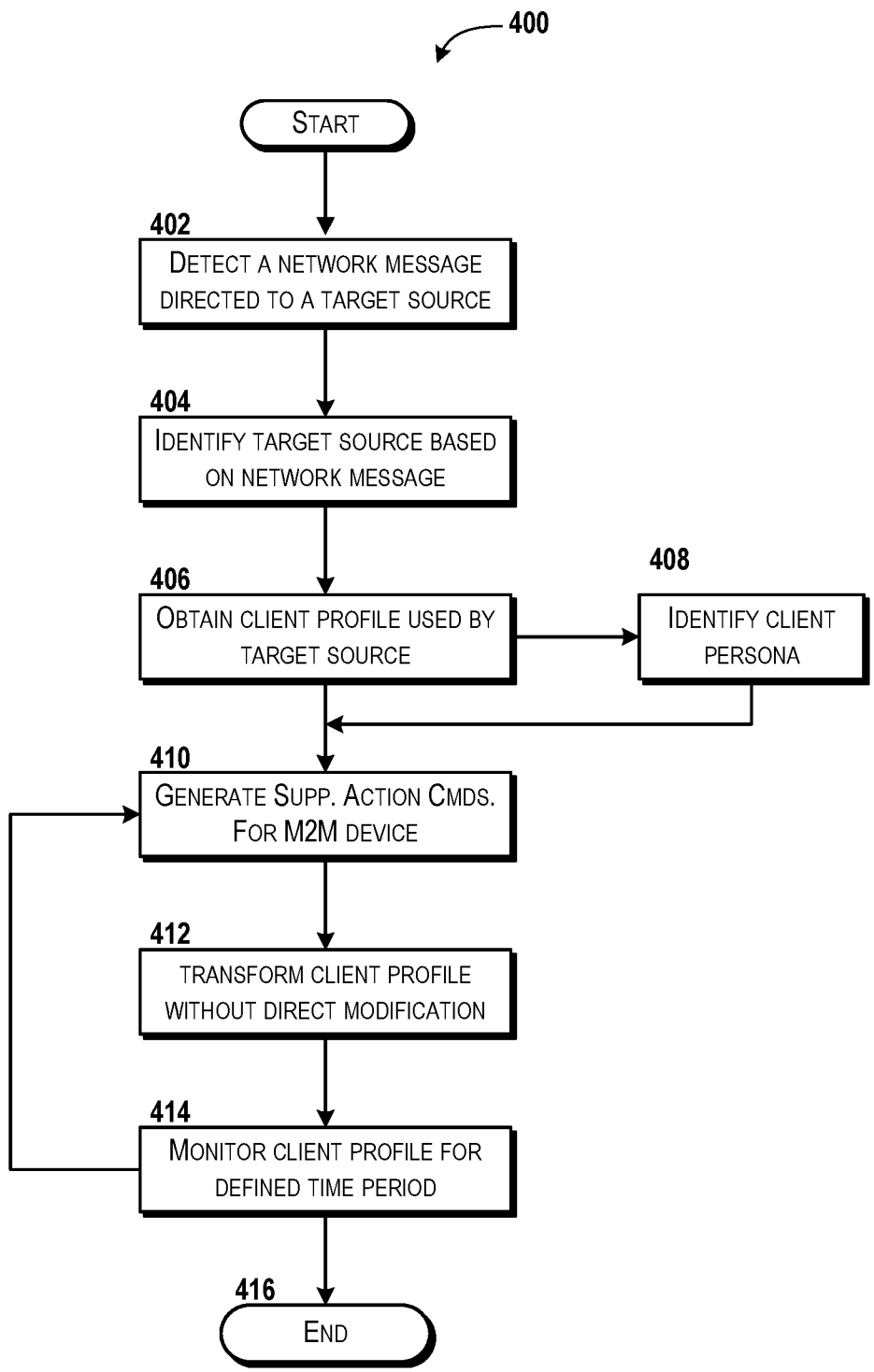
FIG. 4 is a flow diagram showing aspects of a method for providing network activity concealment over a defined time period using a network service, according to an illustrative embodiment of the concepts and technologies described herein.

Regarding FIG. 2C, FIGS. 3A and 3B, and FIG. 4, aspects of methods, will be described in detail, according to one or more illustrative embodiment. Specifically, FIG. 2C shows a method 250 for activating and configuring aspects of network activity concealment, according to an illustrative embodiment. FIG. 3A shows a method 300 for facilitating generation of supplemental network messages for network activity concealment using a network service, according to an illustrative embodiment. FIG. 3B shows a method 350 for providing network activity concealment using a machine-to-machine device, according to an illustrative embodiment. FIG. 4 shows a method 400 for providing network activity concealment using a network service, according to one or more illustrative embodiment. It should be understood that the operations of the methods disclosed herein (e.g., the methods 250, 300, 350, and 400) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It is understood that operations shown in one method may be performed in another method. It is also understood that aspects of the discussion with respect to FIG. 1 and FIGS. 2A-2B may also be included in a method, according to the concepts and technologies discussed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Therefore, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the M2M device 110 and/or the network server 150, to perform one or more operations and/or causing the processor to direct other components of the computing system or device to perform one or more of the operations.

Turning now to FIG. 2C, aspects of the method 250 for activating and configuring aspects of network activity concealment will be discussed, according to an embodiment. For purposes of illustrating and describing the concepts of the present disclosure, the method 250 disclosed herein is described as being performed by accessing the network service portal 155, such as by the M2M device 110 executing one or more computer-readable instructions such as, for example, the PCG 120 that configures one or more processors, such as one or more instances of the processor 111. It should be understood that additional and/or alternative devices can provide the functionality described herein via execution of one or more modules, applications, and/or other software including, but not limited to, the network service 154 that can execute and configure a device, such as but not limited to the network server 150. Thus, the illustrated embodiments are illustrative, and should not be viewed as being limiting in any way.

The method 250 can begin and proceed to operation 252, where the PCG 120 can be activated so as to monitor the client actions 116A-N that are implemented based on the user input 105. From operation 252, the method 250 can proceed to operation 254, where the PCG 120 can present a user interface, such as but not limited to, any of the user interface diagrams discussed with respect to FIG. 2A and/or FIG. 2B. In various embodiments, the user interface can enable configuration and/or adjustment of settings for the operation and function of the network service 154 and concealment of network activity. The PCG 120 can present one or more interactive user interface options, such as one or more selectable buttons that can receive user input. For example, any of the user interface diagrams illustrated with respect to FIGS. 2A and 2B may be presented to the user 103. In various embodiments, the PCG 120 may monitor and detect for instances of the user input 105. In response to detecting the user input 105, the PCG 120 may perform one or more operations to determine how the user input 105 should be handled. For clarity purposes only, a discussion pertaining to various determinations for handling the user input 105 will be provided.

From operation 254, the method 250 can proceed to operation 256, where the PCG 120 can determine whether the user input 105 corresponds to setting and/or (re)configuring a target profile of the M2M device 110, such as the client profile 156. In some embodiments, the PCG 120 determines that the user input 105 indicates a request to set and/or (re)configure the client profile 156, and therefore the method 250 may proceed along the YES path to operation 258, where the PCG 120 can present options associated with the process for setting and/or configuring (albeit indirectly) the client profile 156, such as any of the options 209A-N discussed with respect to FIG. 2B. From operation 258, the method 250 can proceed to operation 260, where the PCG 120 can detect which options (e.g., any of the options 209A-N) were provided by the user input 105, and in turn can collect the user input 105 as a response to the presented options. In some embodiments, from operation 260, the method 250 may proceed to operation 276, which will be discussed below. In some embodiments, from operation 260, the method 250 may proceed to operation 274, where the PCG 120 can save the setting and configuration for concealing network activity based on the collected responses. In some embodiments, the settings and/or configuration can be stored or otherwise recorded locally on a user equipment (e.g., the M2M device 110) and/or at a remote data store, such as the network server 150.

Returning to operation 256, in some embodiments, the PCG 120 may determine whether that user input 105 does not correspond to setting and/or configuring the type of supplemental client actions 122A-N, and therefore the method 250 may proceed along the NO path from operation 256 to operation 262. At operation 262, in some embodiments, the PCG 120 may determine that the user input 105 corresponds to setting and/or configuring the type of supplemental client actions 122A-N, and in turn, the method 250 may proceed along the YES path to operation 264, where PCG 120 can present options, such as the options 211A-N discussed with respect to FIG. 2B. From operation 264, the method 250 can proceed to operation 266, where the PCG 120 can detect which options (e.g., any of the options 211A-N) were provided by the user input 105, and in turn can collect the user input 105 as a response to the presented options. In some embodiments, from operation 266, the method 250 may proceed to operation 276, which will be discussed below. In some embodiments, from operation 266, the method 250 may proceed to operation 274, where the PCG 120 can save the setting and configuration for concealing network activity based on the collected responses.

Returning to operation 262, in some embodiments, the PCG 120 may determine that the user input 205 does not correspond to setting and/or configuring the type of the supplemental client actions 122A-N, and therefore the method 250 may proceed along the NO path to operation 268. At operation 268, the PCG 120 can determine whether an instance of the user input 105 corresponds to an option for setting and/or (re)configuring runtime intervals of the PCG 120 for network activity concealment, such as by selection of the content generation schedule button 212. In some embodiments, if the user input 105 was not provided and/or the user input does not correspond with setting and/or (re)configuring runtime intervals, then the method 250 may proceed along the NO path to operation 254, which is discussed above. In some embodiments, if the user input corresponds to setting and/or (re)configuring the runtime schedule and/or intervals of the PCG 120, then the method 250 may proceed along the YES path to operation 270, where the PCG 120 can present options, such as the options 213A-N discussed with respect to FIG. 2B. In some embodiments, if an instance of the user input 105 is provided with respect to one of the options (e.g., the options 213A-N), then the method 250 may proceed to operation 272, where the PCG 120 can collect the user input 105 as a response and set or otherwise reconfigure runtime intervals, the schedule, and/or intensity level by which the PCG 120 should operate to implement the supplemental client actions 122A-N and provide network activity concealment. In some embodiments, the method 250 may proceed to operation 276, which will be discussed below. In some embodiments, from operation 272, the method 250 may proceed to operation 274, where the PCG 120 can save the setting and configuration for concealing network activity based on the collected responses.

At operation 276, the PCG 120 and/or the client application 114 can generate, execute, and/or implement one or more instances of the supplement client actions 122A-N based on the configuration of the PCG 120 that was provided via the setting of various options. In some embodiments, the method 250 may proceed from operation 276 to operation 278, where the method 250 may end.

Turning now to FIG. 3A, aspects of the method 300 for facilitating generation of supplemental network messages for network activity concealment using a network service will be discussed, according to an embodiment. For purposes of illustrating and describing the concepts of the present disclosure, the method 300 disclosed herein is described as being performed by the network server 150 executing one or more computer-readable instructions such as, for example, the network service 154 that configure one or more processors, such as one or more instances of the processor 151. It should be understood that additional and/or alternative devices can provide the functionality described herein via execution of one or more modules, applications, and/or other software. Thus, the illustrated embodiments are illustrative, and should not be viewed as being limiting in any way.

The method 300 can begin and proceed to operation 302, where the network service 154 can detect an instance of the network message 130 that is directed to a target source, such as the target source 142. In various embodiments, the network message 130 may be detected as the network message 130 is being routed through a network, such as any of the network 102, the RAN 104, and/or the service provider network 108. The network message 130 can be generated by the client application 114 of the M2M device 110. In some embodiments, the network service 154 may detect the network message based on the M2M device 110 informing the network service 154 that the network message 130 is being sent. In some embodiments, from operation 302, the method 300 may proceed to operation 303, where the network service 154 may intercept the network message 130. In some embodiments, interception of the network message 130 may occur prior to the network message 130 reaching the target source 142. In some embodiments, the method 300 may proceed from operation 303 to operation 304. In some embodiments, the method 300 may proceed from operation 302 directly to operation 304.

At operations 304, the network service 154 can identify an instance of the client actions 116A-N based on the network message 130. For example, in some embodiments, an instance of the client actions 116A-N can include at least one of the client application 114 requesting the content 143 from the target source 142, instantiating a tracking marker (e.g., any of the tracking markers 118A-N) associated with the target source 142, retrieving the content 143 from the target source 142, and indicating a preference of the M2M device 110 corresponding to the content 143 provided by the target source 142. It should be understood that the examples provided are for illustration purposes only, and therefore should not be construed as limiting in any way.

In some embodiments, from operation 304, the method 300 may proceed to operation 305, where the network service 154 may determine an indication of content preference and/or an indication of an activity attribute corresponding to the client actions 116A-N, such as determining the content preference indicator 118 and/or the activity attribute indicator 119. In some embodiments, the content preference indicator 118 and/or the activity attribute indicator 119 may be included in the network message 130. From operation 305, the method 300 can proceed to operation 306. In some embodiments, the method 300 may proceed from operation 304 directly to operation 306.

At operation 306, the network service 154 can determine whether the client persona 124 associated with the M2M device 110 is active. In some embodiments, if the client persona 124 is active, then the method 300 may proceed along the YES path to operation 308, where the network service 154 can identify the configuration of the supplemental action command 162 based on at least one of the client persona 124, the network message 130 (including any content preference indicators included therein), and the client profile 156. In some embodiments, the network service 154 can determine that an instance of the client action (e.g., the client action 116A) corresponds to a first content preference indicator, such as the content preference indicator 118. In some embodiments, the supplemental action command 162 can be generated such that a second content preference indicator (e.g., the content preference indicator 123) is created by implementing the supplemental client action 122A-N, which may serve to counterpoise the first content preference indicator (e.g., the content preference indicator 118). From operation 308, the method 300 may proceed to operation 310.

Returning to operation 306, in some embodiments, the PCG 120 and/or the network service 154 may determine that the client persona 124 is not active and/or is not in use. In some embodiments, the network service 154 can instruct the PCG 120 to present a request to the user 103 to suggest setup and/or activation of the client persona 124, which in turn can enable customization as to how the network message 130 (and any preferences indicated thereby) can be neutralized and/or counterpoised. In some embodiments, once the PCG 120 and/or the network service 154 validates that an instance of the client persona 124 is not active (or otherwise should not be used) on the M2M device 110, the network service 154 may proceed to conceal the network activity of the M2M device 110. In some embodiments, the network service 154 may override the inactive state of an instance of the client persona 124 and (randomly) select an instance of the client persona 124 to implement without direct user activation, although this may not necessarily be the case. In some embodiments, the network service 154 may generate and/or instruct the implementation of the supplemental client actions (e.g., the supplemental client actions 122A-N) so as to indicate preferences at random and/or in a non-uniform manner (e.g., by each session of supplemental client actions 122A-N being configured to represent different instances of the client persona 124 each time, which in turn can cause instances of the supplemental network message 170 include indications of preferences which conform to the selected client person so as to conceal and counterpoise the authentic preferences of the user 103 and the user input 105). In various embodiments, the method 300 may proceed along the NO path from operation 306 directly to operation 310.

At operation 310, the network service 154 can counterpoise the client action (e.g., the client action 116A) by generating a supplemental action command (e.g., the supplemental client action 122A). In some embodiments, the supplemental action command 162 can instruct the M2M device 110 to initiate one or more (i.e., a plurality) of the supplemental client actions 122A-N that generates one or more instances of a supplemental network message 170. In some embodiments, the network message 130 can include a network address (e.g., the target address 132) corresponding to a target server (e.g., the target server 140) that is associated with the target source 142. In some embodiments, the supplemental network message 170 is directed to an alternate source, such as by indicating the target address 172 that is associated with the alternate source 146 and alternate content 147. In some embodiments, the network service 154 can facilitate concealment of network activity by providing the supplemental action command (e.g., the supplemental action command 162) to the M2M device 110.

From operation 310, the method 300 may proceed to operation 312, where the network service 154 may obtain an instance of the network usage record 180, where the network usage record 180 can identify instances of network activity by the M2M device 110, such as by the network message records 182A-N and the supplemental network message records 184A-N. From operation 312, the method 300 may proceed to operation 314, where the network service 154 may isolate, from the network usage record 180, client action records that indicate network activity associated with the user input 105, such as by isolating and extracting one or more instances of the network message records 182A-N that provide a record of the particular client action that generated the network message 130. In some embodiments, the client action records (e.g., provided by the network message records 182A-N) can be made available to the network service portal 155. In some embodiments, from operation 314, the method 300 may proceed to operation 322, where the method 300 may end.

Returning to operation 310, in some embodiments, the method 300 may proceed instead to operation 316, where the network service 154 can detect the generation and/or transmission of one or more instance of the supplemental network message 170. In some embodiments, the network service 154 may detect the supplemental network message 170 as the supplemental network message 170 is being routed through a network (e.g., the network 102, the RAN 104, and/or the service provider network 108). In some embodiments, the network service 154 may be informed of the supplemental network message 170 by the PCG 120 of the M2M device 110. In some embodiments, from operation 316, the method 300 may proceed to operation 318, where the network service 154 may release the network message 130 so as to be routed to the target source 142. In some embodiments, the network message 130 may be released and/or provided to the target source 142 in response to one or more operations, such as detecting the supplemental network message 170 from the M2M device 110. From operation 318 or operation 316, the method 300 may proceed to operation 320. At operation 320, the network service 154 may provide and/or route the network message 130 and/or the supplemental network message 170 to their respective targets. In some embodiments, from operation 320, the method 300 may proceed to one or more operations discussed with respect to FIG. 4, such as operation 406 according to an embodiment. In some embodiments, the method 300 may proceed from operation 320 to operation 322, where the method 300 may end. It should be understood that these examples are illustrative and therefore should not be construed as being limiting in any way.

Turning now to FIG. 3B, aspects of the method 350 for providing network activity concealment using a machine-to-machine device will be discussed, according to another embodiment. In various embodiments, one or more operations of the method 350 may be provided by the PCG 120 and/or the network service 154 that includes instructions which can be executed by a processor of a user equipment, such as an instance of the M2M device 110. It is understood that, in some embodiments, one or more operations discussed with respect to the method 350 may be performed in various embodiments according to the concepts and technologies discussed herein.

The method 350 can begin and proceed to operation 352, where the PCG 120 can detect an instance of the client action (e.g., any of the client actions 116A-N) and/or the network message 130 that is directed to the target source 142 and sent by the client application 114. From operation 352, the method 350 may proceed to operation 354, where the PCG 120 may identify the target source 142, the client persona 124, and/or the client actions 116A-N (e.g., any indications of preference of the user 103 provided by the content preference indicator 118 and/or the type of client action indicated by the activity attribute indicator 119). In some embodiments, the method 350 may proceed to operation 360, which will be discussed below in further detail. In some embodiments, the method 350 may instead proceed from operation 354 to operation 356, where the PCG 120 can inform the network service 154 of the target source 142, the client persona 124, and/or the client actions 116A-N. In some embodiments, the information that is used to inform the network service 154 may be provided in an instance of the activity records 186.

From operation 356, the method 350 may proceed to operation 358, where the PCG 120 may receive one or more instances of the supplemental action command 162. The supplemental action command 162 may be received in response to informing the network service 154 of implementation of the client actions 116A-N that generated at least one instance of the network message 130. Instances of the supplemental action command 162 can instruct the PCG 120 to implement one or more instances of the supplemental client action 122A-N.

From operation 358, the method 350 may proceed to operation 360, where PCG 120 can counterpoise the client actions 116A-N and any preferences indicated by the network message 130 by implementing and executing one or more instances of the supplemental client actions 122A-N. In various embodiments, implementation of the supplemental client actions 122A-N can generate one or more instances of the supplemental network message 170, which can counterpoise the network message 130 and any authentic preference indicators included therein by causing network usage records 180 to become saturated with the inauthentic preferences provided by instances of the supplemental network message 170 (which may be reflected in the supplemental network message records 184A-N). In various embodiments, counterpoising the client actions 116A-N can balance out the authentic preferences of the user 103 so as to conceal network activity of the M2M device 110. In some embodiments, the method 350 may proceed from operation 360 to operation 370, where the method 350 may end. In some embodiments, the method 350 may, alternatively, proceed from operation 360 to operation 362.

At operation 362, the PCG 120 may instruct the network service 154 to create the client action map 188. The client action map 188 may be created based on one or more instances of the activity records 186. In some embodiments, the client action map 188 can include the client action records 190A-N, the persona identifier 192 associated with the client persona 124, and/or the session identifier 194. The client action map 188 can be provided to the network service portal 155 so as to enable searching of authentic preferences and authentic network activity by the M2M device 110 by isolating the network message records 182A-N and providing identification of the client actions 116A-N via the client action records 190A-N. In some embodiments, the method 350 may proceed from operation 362 to operation 370, where the method 350 may end. In some embodiments, the method 350 may, instead, proceed from operation 362 to operation 366, which is discussed below.

In some embodiments, from operation 362, the method 350 may proceed to operation 364, where the PCG 120 may instruct the client application 114 to suppress presentation of the supplemental client actions 122A-N and/or any content received in response to the supplemental network message 170 (e.g., one or more instances of the network responses 174A-N that may include a content package that is from the target identified by the supplemental network message 170, such as the alternate source 146). In some embodiments, suppressing the presentation of information from the client application 114 can include switching tabs, downsizing windows, or otherwise causing the client application 114 to run as a background task without presenting a user interface to the user 103. In some embodiments, the client application 114 may continue to allow the user 103 to engage the target source 142 by implementing the client actions 116A-N without presenting the concurrently executing supplemental client actions 122A-N.

From operation 364, the method 350 may proceed to operation 366, where the PCG 120 can purge a first tracking marker that corresponds to a client action, such as the tracking marker 118A that may correspond to client action 116A. In some embodiments, purging, reconfiguring, and/or instantiating a tracking marker (e.g., a cookie) may enable concealment of authentic preferences of the user 103.

From operation 366, the method 350 may proceed to operation 368, where the PCG 120 can maintain a second tracking marker that corresponds to a supplemental client action, such as the tracking marker 118B that may correspond to the supplemental client action 122A. By this, the network usage records 180 may reflect that a transformation in user preferences and enable concealment of network activity from the M2M device 110. From operation 368, the method 350 may proceed to operation 370, where the method 350 may end.

Turning now to FIG. 4, aspects of the method 400 for providing network activity concealment using a network service will be discussed, according to another embodiment. In various embodiments, one or more operations of the method 400 may be provided by the network service 154 that includes instructions which can be executed by a processor of computer system, such as an instance of the network server 150. It is understood that, in some embodiments, one or more operations discussed with respect to the method 400 may be performed in various embodiments according to the concepts and technologies discussed herein.

The method 400 can begin and proceed to operation 402, where the network service 154 may detect an instance of the network message 130 that is directed to the target source 142. In some embodiments, the network service 154 may detect the network message 130 as the network message 130 is being routed through a network (e.g., any of the network 102, the RAN 104, and/or the service provider network 108). In some embodiments, the network service 154 may detect the network message 130 based on receiving an instance of the activity record 186 from the M2M device 110 that enables identification and detection of the network message 130.

From operation 402, the method 400 may proceed to operation 404, where the network service 154 may identify the target source 142 based on the target address 132 of the network message 130. In some embodiments, identification of the target source 142 can allow the network service 154 to determine a preference associated with the user 103, and in turn determine how the network activity provided by the network message 130 should be concealed.

From operation 404, the method 400 may proceed to operation 406, where the network service 154 may obtain a client profile associated with the M2M device 110, such as the client profile 156. The client profile 156 may be used by the target source 142 in order for the target server 140 to determine what preferences pertain to the user 103 and/or how content should be delivered to the M2M device 110. In some embodiments, the client profile 156 may be maintained by the network server 150 or another party.

In some embodiments, the method 400 may proceed from operation 406 to operation 410, which will be discussed below. In some embodiments, the method 400 may, instead, proceed from operation 406 to operation 408, where the network service 154 may identify the client persona 124 associated with the M2M device 110. The client persona 124 may indicate one or more inauthentic preferences that can be implemented and applied to supplemental client actions 122A-N in order to conceal and mask the network activity indicated by the network message 130. The network service 154 can analyze the client persona 124 and the client profile 156 in order to determine the content and preferences that should be autonomously generated on the M2M device 110 in order to conceal or otherwise counterpoise the authentic network activity provided by the network message 130 that indicates authentic preferences of the user 103. From operation 408, the method 400 may proceed to operation 410.

At operation 410, the network service 154 can generate one or more instances of the supplemental action command 162 for the M2M device 110. The supplemental action command 162 can instruct the M2M device 110 to implement one or more instances of the supplemental client actions 122A-N so as to generate and transmit one or more instances of the supplemental network message 170. The supplemental action command 162 can be configured based on the target source 142, the client profile 156, and/or the client persona 124 so as to instruct the client application 114 to conceal the network activity of the M2M device 110 by generating one instance or a plurality of instances of the supplemental network message 170.

From operation 410, the method 400 may proceed to operation 412, where the network service 154 can transform the client profile 156 into the client profile 156' without direct modification of the client profile 156 (i.e., without the network service 154 directly reconfiguring a master version). The network service 154 can indirectly modify and transform the client profile 156 into the client profile 156' such that instances of the client profile 156' reflects and indicates a collection of authentic preferences of the user 103 and inauthentic preferences so as to effectively conceal the authentic preferences. For example, the network service 154 can provide or otherwise transmit one or more instances of the supplemental action command 162 to the M2M device 110 so as to instruct the PCG 120 to implement the supplemental client actions 122A-N, which in turn generates one or more instances of the supplemental network message 170. Instances of the supplemental network message 170 may be detected and recorded in the network usage records. For example, the network usage records 180 may be updated based on the transmission and routing instances of the supplemental network message 170, and in turn one or more instances of the supplemental network message records 184A-N may be created to reflect the detected supplemental network message 170. Another network device that is responsible for handling the client profile 156 (e.g., the target server 140 or another server associated with the service provider network 108) may be configured to update the client profile 156 based on newly created records in the network usage records 180. In turn, the client profile 156 can be independently transformed into the client profile 156' based on the network usage records 180 provided by the particular network (e.g., the service provider network 108). For example, the supplemental network message records 184A-N may include instances of the content preference indicator 123 (which although are inauthentic preferences, appear authentic in the network usage records 180) that may have been included in the supplemental network message 170. In turn, the client profile 156 may be transformed by the handling network device (which is not the network server 150 and/or the network service 154) so as to reflect the change in indicated preferences of the user 103 (albeit inauthentic preferences). Therefore, the network service 154 can indirectly cause the transformation of the client profile 156 into the client profile 156' by instructing the PCG 120 and/or the client application 114 to implement the supplemental client actions 122A-N and transmit instances of the supplemental network message 170.

From operation 412, the method 400 may proceed to operation 414, where the network service 154 can monitor the client profile 156 during a defined time period, such as the time period 158. The network service 154 can monitor the transformation of the client profile 156 to a transformed client profile, such as the client profile 156', based on the M2M device 110 transmitting instances of the supplemental network message 170. Specifically, the network service 154 may (a)periodically pull instances of the client profile 156 from a network device that handles the configuration of client profiles for various devices (not shown). As such, the network service 154 may not be granted authorization to directly modify the client profile 156. However, despite not being authorized to modify the client profile 156, the network service 154 can obtain and/or view the client profile 156 during the time period 158, and monitor whether the client profile 156 is reflecting or otherwise indicating inauthentic preferences (e.g., corresponding to the content preference indicator 123). If inauthentic preferences are being indicated, then the client profile 156 may be in the process of transforming into the client profile 156'. The network service 154 may continue to transmit instances of the supplemental action command 162 (thus causing multiple instances of the supplemental network message 170 to be transmitted and the client profile 156 further transformed) until the network service determines that the client profile 156 has been transformed into the client profile 156'. In some embodiments, the network service can detect that the client profile 156 has been transformed in response to determining that the authentic preferences (e.g., instances of the content preference indicator 118) are interspersed among the inauthentic preferences (e.g., the content preference indicator 123) such that number of instances of the inauthentic preferences are equal to, or greater than, the number of instances of the authentic preferences. In some embodiments, the content preference indicator 123 (which corresponds to inauthentic preferences) may be referred to as an inauthentic preference indicator. In some embodiments, the content preference indicator 118 (which corresponds to authentic preferences) may be referred to as an authentic preference indicator. It is understood that the examples discussed are for illustration purposes only, and therefore should not be construed as limiting in any way. In various embodiments, the network service 154 may cease sending the supplemental action command 162 when the client profile 156 has been transformed. In some embodiments, the network service 154 may (re)institute generation and transmission of the supplemental action commands 162 in response to determining that the previously transformed client profile (e.g., client profile 156') has reverted back to (predominately) reflecting authentic preferences, and thus the network service 154 may continue sending the supplemental action commands 162 to the PCG 120 until the network activity of the M2M device is once again conceal (e.g., by the supplemental network message 170 being sent and a corresponding client profile being (re)transformed to reflect inauthentic preferences). In some embodiments, the method 400 may proceed from operation 414 to one or more operations discussed herein, such as operation 410 discussed above. In some embodiments, the method 400 may proceed from operation 414 to operation 416, where the method 400 may end.

Figure 5:
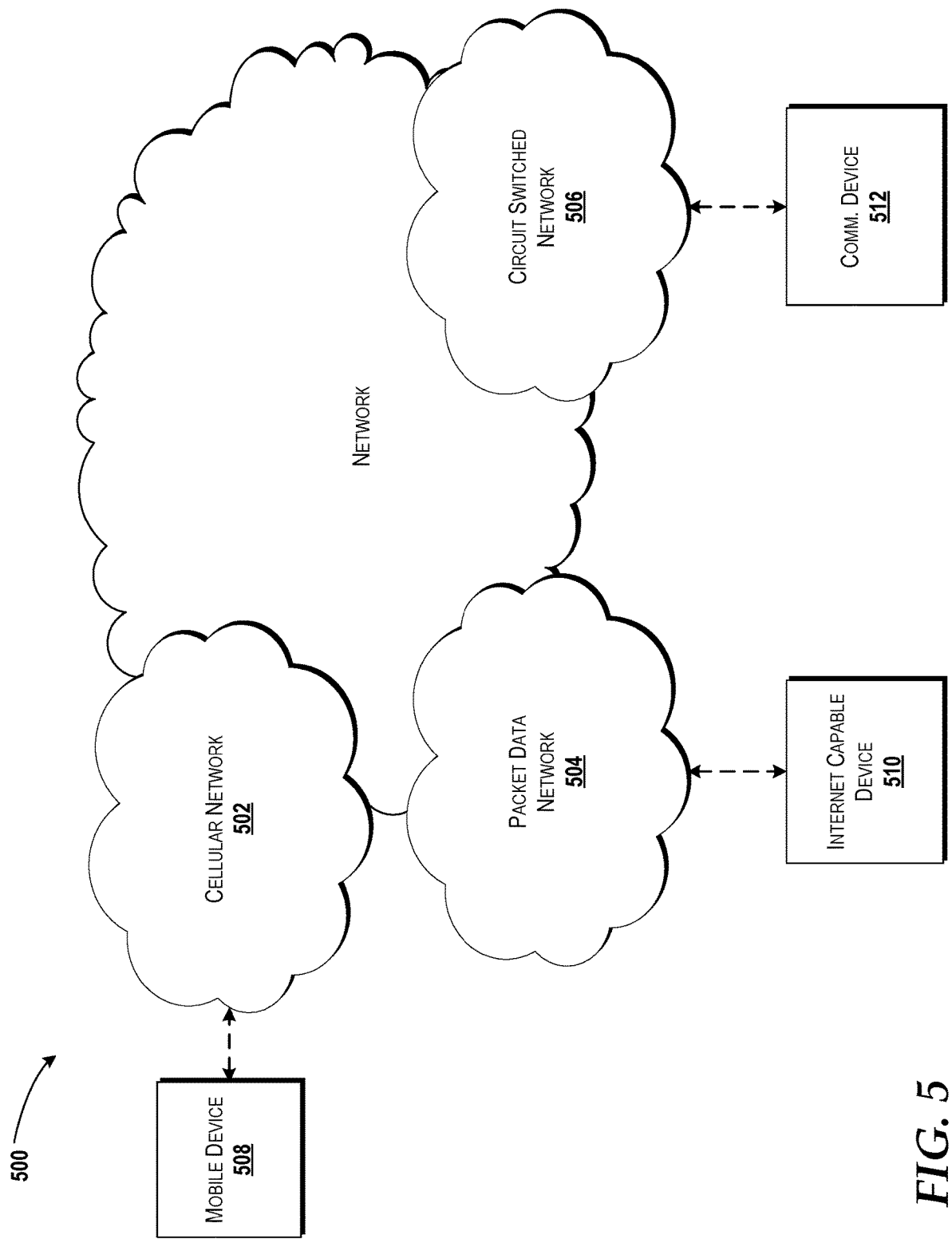
FIG. 5 schematically illustrates a network, according to an illustrative embodiment of the concepts and technologies described herein.

Turning now to FIG. 5, a discussion of a network 500 is illustrated, according to an illustrative embodiment. The network 102, the RAN 104, and/or the service provider network 108 shown in FIG. 1 can be configured substantially similar to the network 500 and/or include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 102 and/or the network 500 refers broadly to any combination of the networks 502, 504, 506. It should be appreciated that substantially all of the functionality described with reference to the network 102 and/or the network 500 can be performed by the cellular network 502, the packet data network 504, and/or the circuit switched network 506, alone or in combination with other networks, network elements, and the like. Although not illustrated separately in FIG. 5, it should be understood that the RAN 104 and/or the service provider network 108 can be a part of the cellular network 502, though this is not necessarily the case.

Figure 6:
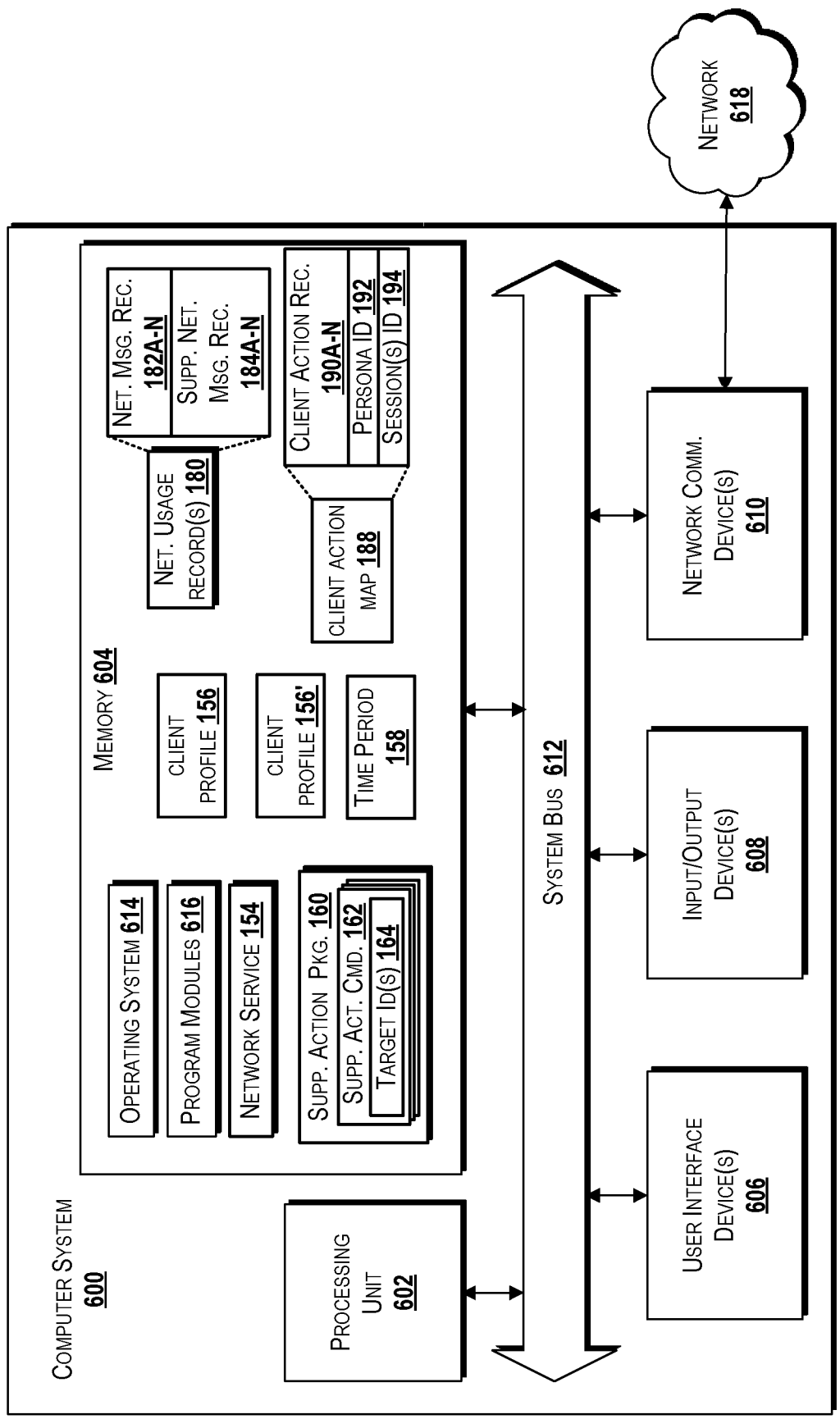
FIG. 6 is a block diagram illustrating an example computer system configured to provide, implement, and/or otherwise support private a call blocking service, according to some illustrative embodiments of the concepts and technologies described herein.

FIG. 6 is a block diagram illustrating a computer system 600 configured to provide the functionality described herein for providing web activity concealment using a network activity concealment service, such as the network service 154, in accordance with various embodiments of the concepts and technologies disclosed herein. In aspects, the network server 150, the target server 140, and/or the alternate server 144 illustrated and described herein can be configured as and/or can have an architecture similar or identical to the computer system 600. In some embodiments, the M2M device 110 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, instances of the processor 111 and/or the processor 151 can be configured substantially similar to the processing unit 602. In some embodiments, instances of the memory 112 and/or the memory 152 can be configured substantially similar to the memory 604.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include network service 154, the PCG 120, and/or other computer-readable instructions. These and/or other programs can be embodied in computer-readable media containing instructions that, when executed by the processing unit 602, cause a processor to perform one or more operations of the methods 250, 300, 350, and 450 described in detail above with respect to FIGS. 3A-B and 4. According to some embodiments, the program modules 616 may be embodied in hardware, software, firmware, or any combination thereof. It should be understood that the memory 604 also can be configured to store one or more instance of information discussed with respect to FIG. 1 and FIGS. 2A-2B, such as but not limited to the supplemental action package 160, the supplemental action commands 162, the target identifiers 164, the client profile 156, the client profile 156', the time period 158, the network usage records 180, the network message records 182A-N, the supplemental network message records 184A-N, the client action map 188, the client action records 190A-N, the persona identifier 192, the session identifier 194, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more other devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 102, the RAN 104, and/or the service provider network 108. Examples of the network devices 610 include, but are not limited to, a modem, a radio frequency ("RF") or infrared ("IR") transceiver, a telephonic interface, a bridge, a router, or a network card. The network 102, the RAN 104, and/or the service provider network 108 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively and/or additionally, the network 102 and/or service provider network 108 may be configured to include a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
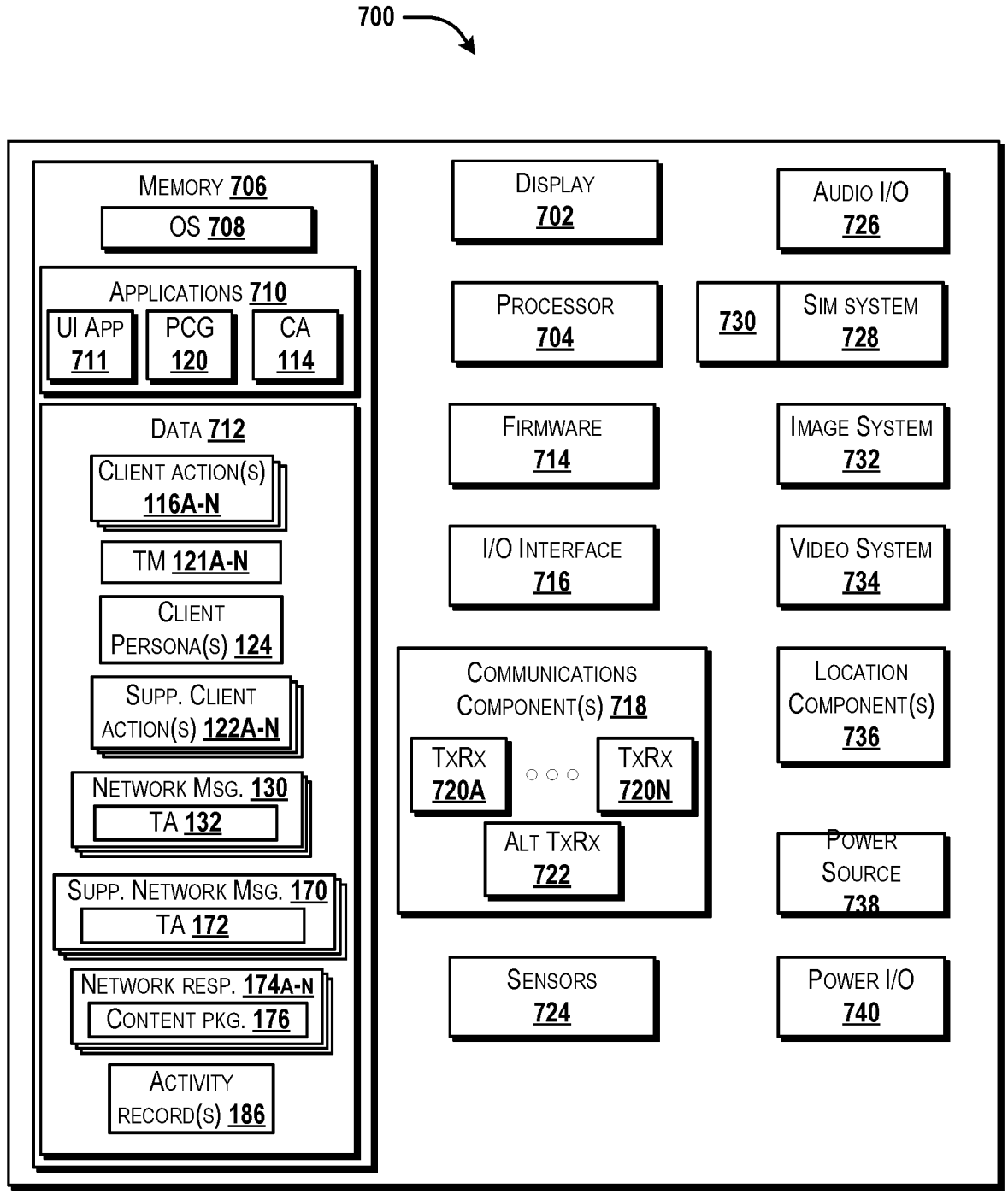
FIG. 7 is a block diagram illustrating an example communication device configured to interact with a private call blocking service, according to some illustrative embodiments of the concepts and technologies described herein.

Turning now to FIG. 7, an illustrative user equipment 700 and components thereof will be described. In some embodiments, one or more instances of the M2M device 110, and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to display various graphical user interface ("GUI") elements for presenting and/or modifying information associated with a custom private caller ID mask, creating private call instructions, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the PCG 120, the client application 114, and/or other computer-executable instructions stored in a memory 706, or the like.

In some embodiments, the applications 710 also can include a UI application 711. The UI application 711 can interface with the operating system 708, such as an operating system that can be implemented in FIG. 1, to facilitate user interaction with functionality and/or data stored at the user equipment 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. It is understood that one or more instances of an operating system (e.g., the operating system 708) may be implemented in one or more devices discussed with respect to the operating environment 100 in FIG. 1. These operating systems are merely illustrative of some contemplated operating systems that may be used in accordance with various embodiments of the concepts and technologies described herein and therefore should not be construed as being limiting in any way.

The UI application 711 can be executed by the processor 704 to aid a user in entering user input (e.g., the user input 105), displaying content (e.g., the content 143 and/or the alternate content 147), configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. According to various embodiments, the data 712 can include, for example, instances of the client actions 116A-N, the tracking markers 121A-N, the client persona 124, the supplemental client actions 122A-N, the network message 130, the target address 132, the supplemental network message 170, the target address 172, the network responses 174A-N, the content package 176, the activity records 186, the supplemental action package 160, the supplemental action commands 162, the target identifiers 164, the user input 105, any other elements discussed with respect to FIG. 1 and FIGS. 2A-2C, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. The I/O interface 716 can be configured to support the input/output of data such as the user input 105, any other information discussed with respect to FIG. 1, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, any other USB interface, an audio jack, a PS2 port, an IEEE 1394 ("FIREWIRE") port, a serial port, a parallel port, an Ethernet (RJ45) port, an RJ11 port, a fiber optic port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system ("image system") 732. The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740.

Because the user equipment 700 can include additional and/or alternative components, the above embodiment should be understood as being illustrative of one possible operating environment for various embodiments of the concepts and technologies described herein. The described embodiment of the user equipment 700 is illustrative, and should not be construed as being limiting in any way.

Based on the foregoing, it should be appreciated that systems and methods for web activity concealment have been disclosed herein. Although the subject matter presented herein may have been described in language specific to computer structural features, methodological and transformative acts, specific computing machinery, and computer-readable media, it is to be understood that the concepts and technologies disclosed herein are not necessarily limited to the specific features, acts, or medium described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, in response to being executed by the processor, cause the processor to perform operations comprising:
      detecting generation of a network message by a client application executing on a machine-to-machine device, wherein the network message is generated by the client application based on a client action, and wherein the network message is directed to a target source,
      identifying, based on information associated with the network message, the client action that is associated with the client application, and
      counterpoising the client action by
         generating a supplemental action command, and
         providing the supplemental action command to the machine-to-machine device, wherein the supplemental action command instructs the client application executing on the machine-to-machine device to generate and transmit a supplemental network message that counterpoises the client action, wherein both the network message and the supplemental network message are transmitted by the machine-to-machine device, wherein the machine-to-machine device is instructed to withhold transmission of the network message until after generation of the supplemental network message, and wherein transmission of the supplemental network message by the machine-to-machine device occurs prior to transmission of the network message by the machine-to-machine device.

2. The system of claim 1, wherein the client action comprises at least one of requesting content from the target source, instantiating a tracking marker associated with the target source, retrieving content from the target source, and indicating a preference corresponding to content provided by the target source.

3. The system of claim 1, wherein the supplemental action command further instructs the machine-to-machine device to initiate a supplemental client action that generates the supplemental network message.

4. The system of claim 3, wherein the network message comprises a network address corresponding to a target server that is associated with the target source, and wherein the supplemental network message is directed to an alternate source.

5. The system of claim 1, wherein the operations further comprise determining that the client action corresponds to a first content preference indicator, wherein the supplemental action command is generated such that a second content preference indicator is created so as to counterpoise the first content preference indicator.

6. The system of claim 1, wherein the operations further comprise:
   obtaining a network usage record that identifies instances of network activity by the machine-to-machine device, and
   isolating, from the network usage record, client action records that indicate network activity associated with user input, wherein the client action records are made available to a network service portal.

7. The system of claim 1, wherein the supplemental action command further instructs the machine-to-machine device to purge data received in response to the supplemental network message prior to the data being presented for display by the machine-to-machine device.

8. A method comprising:
   detecting, by a system executing a processor, generation of a network message by a client application executing on a machine-to-machine device, wherein the network message is generated by the client application based on a client action, and wherein the network message is directed to a target source;
   identifying, by the system, based on information associated with the network message, the client action that is associated with the client application; and
   counterpoising, by the system, the client action by
      generating a supplemental action command, and
      providing, by the system, the supplemental action command to the machine-to-machine device, wherein the supplemental action command instructs the client application executing on the machine-to-machine device to generate and transmit a supplemental network message that counterpoises the client action, wherein both the network message and the supplemental network message are transmitted by the machine-to-machine device, wherein the machine-to-machine device is instructed to withhold transmission of the network message until after generation of the supplemental network message, and wherein transmission of the supplemental network message by the machine-to-machine device occurs prior to transmission of the network message by the machine-to-machine device.

9. The method of claim 8, wherein the client action comprises at least one of requesting content from the target source, instantiating a tracking marker associated with the target source, retrieving content from the target source, and indicating a preference corresponding to content provided by the target source.

10. The method of claim 8, wherein the supplemental action command further instructs the machine-to-machine device to initiate a supplemental client action that generates the supplemental network message.

11. The method of claim 10, wherein the network message comprises a network address corresponding to a target server that is associated with the target source, and wherein the supplemental network message is directed to an alternate source.

12. The method of claim 8, further comprising determining, by the processor, that the client action corresponds to a first content preference indicator, wherein the supplemental action command is generated such that a second content preference indicator is created so as to counterpoise the first content preference indicator.

13. The method of claim 8, further comprising:
obtaining, by the processor, a network usage record that identifies instances of network activity by the machine-to-machine device, and
isolating, by the processor, from the network usage record, client action records that indicate network activity associated with user input, wherein the client action records are made available to a network service portal.

14. The method of claim 8, wherein the supplemental action command further instructs the machine-to-machine device to purge data received in response to the supplemental network message prior to the data being presented for display by the machine-to-machine device.

15. A computer storage medium having computer-executable instructions stored thereon that, in response to execution by a processor, cause the processor to perform operations comprising:
detecting generation of a network message generated by a client application executing on a machine-to-machine device, wherein the network message is generated by the client application based on a client action, and wherein the network message is directed to a target source;
identifying, based on information associated with the network message, the client action that is associated with the client application; and
counterpoising the client action by
generating a supplemental action command, and
providing the supplemental action command to the machine-to-machine device, wherein the supplemental action command instructs the client application executing on the machine-to-machine device to generate and transmit a supplemental network message that counterpoises the client action, wherein both the network message and the supplemental network message are transmitted by the machine-to-machine device, wherein the machine-to-machine device is instructed to withhold transmission of the network message until after generation of the supplemental network message, and wherein transmission of the supplemental network message by the machine-to-machine device occurs prior to transmission of the network message by the machine-to-machine device.

16. The computer storage medium of claim 15, wherein the client action comprises at least one of requesting content from the target source, instantiating a tracking marker associated with the target source, retrieving content from the target source, and indicating a preference corresponding to content provided by the target source.

17. The computer storage medium of claim 15, wherein the supplemental action command further instructs the machine-to-machine device to initiate a supplemental client action that generates the supplemental network message.

18. The computer storage medium of claim 15, wherein the operations further comprise determining that the client action corresponds to a first content preference indicator, wherein the supplemental action command is generated such that a second content preference indicator is created so as to counterpoise the first content preference indicator.

19. The computer storage medium of claim 15, wherein the operations further comprise
obtaining a network usage record that identifies instances of network activity by the machine-to-machine device; and
isolating, from the network usage record, client action records that indicate network activity associated with user input, wherein the client action records are made available to a network service portal.

20. The computer storage medium of claim 15, wherein the supplemental action command further instructs the machine-to-machine device to purge data received in response to the supplemental network message prior to the data being presented for display by the machine-to-machine device.

* * * * *